United States Patent
Suzuki et al.

(10) Patent No.: US 10,244,534 B2
(45) Date of Patent: Mar. 26, 2019

(54) TERMINAL DEVICE, BASE STATION DEVICE, INTEGRATED CIRCUIT, AND WIRELESS COMMUNICATION METHOD

(71) Applicant: Sharp Kabushiki Kaisha, Osaka-shi, Osaka (JP)

(72) Inventors: Shoichi Suzuki, Osaka (JP); Tatsushi Aiba, Osaka (JP); Kazunari Yokomakura, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 14/909,161

(22) PCT Filed: Aug. 7, 2014

(86) PCT No.: PCT/JP2014/070818
§ 371 (c)(1),
(2) Date: Feb. 1, 2016

(87) PCT Pub. No.: WO2015/020127
PCT Pub. Date: Feb. 12, 2015

(65) Prior Publication Data
US 2016/0192369 A1 Jun. 30, 2016

(30) Foreign Application Priority Data
Aug. 8, 2013 (JP) .................. 2013-164656

(51) Int. Cl.
*H04W 72/04* (2009.01)
*H04W 52/20* (2009.01)
*H04L 1/18* (2006.01)

(52) U.S. Cl.
CPC ....... *H04W 72/0473* (2013.01); *H04L 1/1854* (2013.01); *H04W 52/20* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 8,054,767 B2 * | 11/2011 | Choi | ..................... | H04L 5/0053 370/252 |
| 9,681,397 B2 * | 6/2017 | Xu | ..................... | H04W 52/243 |
| 2010/0254329 A1 | 10/2010 | Pan et al. | | |
| 2011/0081939 A1 | 4/2011 | Damnjanovic et al. | | |

(Continued)

OTHER PUBLICATIONS

Official Communication issued in International Patent Application No. PCT/JP2014/070818, dated Nov. 4, 2014.

(Continued)

*Primary Examiner* — James P Duffy
(74) *Attorney, Agent, or Firm* — Keating & Bennett, LLP

(57) ABSTRACT

A terminal device controls transmission power using a TPC command that is included in a DCI format 3. In the terminal device, in a case where CRC parity bits that are attached to the DCI format 3 are scrambled with a first RNTI, timing when the TPC command is applied is based on a first uplink-downlink configuration, and in a case where the CRC parity bits that are attached to the DCI format 3 are scrambled with a second RNTI, timing when the TPC command is applied is based on a second uplink-downlink configuration.

8 Claims, 17 Drawing Sheets

(56) References Cited

U.S. PATENT DOCUMENTS

| | | | | |
|---|---|---|---|---|
| 2012/0188974 | A1* | 7/2012 | Qiang | H04W 52/146 |
| | | | | 370/329 |
| 2012/0208583 | A1 | 8/2012 | Chung et al. | |
| 2013/0250882 | A1* | 9/2013 | Dinan | H04W 72/0426 |
| | | | | 370/329 |
| 2013/0272170 | A1* | 10/2013 | Chatterjee | H04W 28/02 |
| | | | | 370/280 |

OTHER PUBLICATIONS

Ericsson et al., "On standardization impact of TDD UL-DL adaptation", 3GPP TSG-RAN WG1 #69, R1-122016, May 21-25, 2012, pp. 1-3.

Ericsson et al., "Signalling support for dynamic TDD", 3GPP TSG-RAN WG1 #72, R1-130558, Jan. 28-Feb. 1, 2013, 3 pages.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, pp. 10-22, 99-104, 146, 166-168.

Potevio, "Discussion About TPC Transmission for CA in LTE-A"; 3GPP TSG RAN WG1 Meeting #60bis; R1-102231; Apr. 12-16, 2010 pp. 1-3.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, pp. 118-132.

\* cited by examiner

FIG. 7

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (PRIMARY CELL UL-DL CONFIGURATION, SECONDARY CELL UL-DL CONFIGURATION) | SECONDARY CELL SECOND UL REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | 4 | 6 | | | |
| 1 | | | 6 | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | | 7 | 7 | | 5 |

FIG. 14

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 7 | 4 | | | 6 | 7 | 4 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

TERMINAL DEVICE, BASE STATION DEVICE, INTEGRATED CIRCUIT, AND WIRELESS COMMUNICATION METHOD

TECHNICAL FIELD

The present invention relates to a terminal device, a base station device, an integrated circuit, and a wireless communication method.

This application claims the benefit of Japanese Priority Patent Application 2013-164656 filed on Aug. 8, 2013, the entire contents of which are incorporated herein by reference.

BACKGROUND ART

In the 3rd Generation Partnership Project (3GPP), a radio access method and a radio network for cellular mobile communication (hereinafter referred to as "Long Term Evolution (LTE)", or "Evolved Universal Terrestrial Radio Access (EUTRA)") have been studied. In LTE, a base station device is also referred to as an evolved NodeB (eNodeB) and a terminal device is also referred to as User Equipment (UE). LTE is a cellular communication system in which an area is divided in a cellular pattern into multiple cells, each being served by a base station device. A single base station device may manage multiple cells.

LTE supports Time Division Duplex (TDD). LTE that employs a TDD scheme is also referred to as TD-LTE or LTE TDD. In TDD, an uplink signal and a downlink signal are time-multiplexed.

In the 3GPP, application of a traffic adaptation technology and an interference reduction technology (DL-UL interference management and traffic adaptation) to TD-LTE has been studied. The traffic adaptation technology is a technology that changes a ratio between an uplink resource and a downlink resource according to uplink traffic and downlink traffic. The traffic adaptation technology is also referred to as a dynamic TDD.

NPL 1 discloses a method of using a flexible subframe as a method of realizing traffic adaptation. The base station device can perform reception of the uplink signal or transmission of the downlink signal on the flexible subframe. In NPL 1, as long as the base station device does not instruct the terminal device to transmit the uplink signal on the flexible subframe, the terminal device regards the flexible subframe as the downlink subframe.

NPL 1 discloses that Hybrid Automatic Repeat reQuest (HARQ) timing for a physical downlink shared channel (PDSCH) is determined based on an uplink-downlink (UL-DL) configuration that is newly introduced and that HARQ timing for a physical uplink shared channel (PUSCH) is determined based on an initial UL-DL configuration.

NPL 2 discloses (a) that an UL/DL reference configuration is introduced and (b) that several subframes can be scheduled by a dynamic grant/assignment from scheduling for either uplink or downlink.

CITATION LIST

Non Patent Document

[NON PATENT DOCUMENT 1] "On standardization impact of TDD UL-DL adaptation", R1-122016, Ericsson, ST-Ericsson, 3GPP TSG-RAN WG1 Meeting #69, Prague, Czech Republic, 21-25 May 2012.

[NON PATENT DOCUMENT 2] "Signalling support for dynamic TDD", R1-130558, Ericsson, ST-Ericsson, 3GPP TSG-RAN WG1 Meeting #72, St Julian's, Malta, 28 Jan.-1 Feb. 2013.

DISCLOSURE OF THE INVENTION

Problems to be Solved by the Invention

However, a specific procedure is not disclosed that is used when the terminal device performs processing associated with transmission power in the wireless communication system as described above. For example, a specific procedure is not disclosed that is used when the terminal device performs transmission power control.

An object of aspects of the present invention, which are considered in view of the problems described above, is to provide a terminal device, a base station device, an integrated circuit, and a wireless communication method, in which processing associated with transmission power is capable of being efficiently performed.

Means for Solving the Problems (1) In order to accomplish the object described above, the following means are contrived according to the aspects of the present invention. That is, according to an aspect of the present invention, there is a provided a terminal device that communicates with a base station device, including: a reception unit that receives a downlink control information format 3; and a transmission power control unit that controls transmission power using a transmission power control command that is included in the downlink control information format 3, in which, in a case where cyclic redundancy check parity bits that are attached to the downlink control information format 3 are scrambled with a first radio network temporary identifier (RNTI), application timing for the transmission power control command is based on a first uplink-downlink configuration, and in which, in a case where the cyclic redundancy check parity bits that are attached to the downlink control information format 3 are scrambled with a second RNTI, application timing for the transmission power control command is based on a second uplink-downlink configuration.

(2) Furthermore, in the terminal device according to the aspect of the present invention, the reception unit may receive first information and second information, and the first uplink-downlink configuration may be based on the first information and the second uplink-downlink configuration may be based on the second information.

(3) Furthermore, according to another aspect of the present invention, there is provided a wireless communication method that is used in a terminal device which communicates with a base station device, including: receiving a downlink control information format 3 and controlling transmission power using a transmission power control command that is included in the downlink control information format 3, in which, in a case where cyclic redundancy check parity bits that are attached to the downlink control information format 3 are scrambled with a first radio network temporary identifier (RNTI), application timing for the transmission power control command is based on a first uplink-downlink configuration, and in which, in a case where the cyclic redundancy check parity bits that are attached to the downlink control information format 3 are scrambled with a second RNTI, application timing for the transmission power control command is based on a second uplink-downlink configuration.

(4) Furthermore, the wireless communication method that is used in a terminal device which communicates with a base station device, according to the aspect of the present invention, may further include receiving first information and second information, in which the first uplink-downlink configuration may be based on the first information and the second uplink-downlink configuration may be based on the second information.

(5) Furthermore, according to still another aspect of the present invention, there is provided an integrated circuit that is used in a terminal device which communicates with a base station device, and that causes the terminal device to perform a sequence of functions including: a function of receiving a downlink control information format 3; and a function of controlling transmission power using a transmission power control command that is included in the downlink control information format 3, in which, in a case where cyclic redundancy check parity bits that are attached to the downlink control information format 3 are scrambled with a first radio network temporary identifier (RNTI), application timing for the transmission power control command is based on a first uplink-downlink configuration, and in which, in a case where the cyclic redundancy check parity bits that are attached to the downlink control information format 3 are scrambled with a second RNTI, application timing for the transmission power control command is based on a second uplink-downlink configuration.

(6) Furthermore, the integrated circuit according to the aspect of the present invention may cause the terminal device to perform the sequence of functions further including: a function of receiving first information and second information, in which the first uplink-downlink configuration may be based on the first information and the second uplink-downlink configuration may be based on the second information.

(7) Furthermore, according to still another aspect of the present invention, there is provided a base station device that communicates with a terminal device, including: a transmission unit that transmits a downlink control information format 3; and a transmission power control unit that controls transmission power for the terminal device using a transmission power control command that is included in the downlink control information format 3, in which, in a case where cyclic redundancy check parity bits that are attached to the downlink control information format 3 are scrambled with a first radio network temporary identifier (RNTI), application timing for the transmission power control command is based on a first uplink-downlink configuration, and in which, in a case where the cyclic redundancy check parity bits that are attached to the downlink control information format 3 are scrambled with a second RNTI, application timing for the transmission power control command is based on a second uplink-downlink configuration.

(8) Furthermore, in the base station device according to the aspect of the present invention, the reception unit may receive first information and second information, and the first uplink-downlink configuration may be based on the first information and the second uplink-downlink configuration may be based on the second information.

(9) Furthermore, according to still another aspect of the present invention, there is provided a wireless communication method that is used in a base station device which communicates with a terminal device, including: transmitting a downlink control information format 3 and controlling transmission power for the terminal device using a transmission power control command that is included in the downlink control information format 3, in which, in a case where cyclic redundancy check parity bits that are attached to the downlink control information format 3 are scrambled with a first radio network temporary identifier (RNTI), application timing for the transmission power control command is based on a first uplink-downlink configuration, and in which, in a case where the cyclic redundancy check parity bits that are attached to the downlink control information format 3 are scrambled with a second RNTI, application timing for the transmission power control command is based on a second uplink-downlink configuration.

(10) Furthermore, the wireless communication method according to the aspect of the present invention may further include: transmitting first information and second information, in which the first uplink-downlink configuration may be based on the first information and the second uplink-downlink configuration may be based on the second information.

(11) Furthermore, according to still another aspect of the present invention, there is provided an integrated circuit that is used in a base station device which communicates with a terminal device, and that causes the base station device to perform a sequence of functions including: a function of transmitting a downlink control information format 3; and a function of controlling transmission power for the terminal device using a transmission power control command that is included in the downlink control information format 3, in which, in a case where cyclic redundancy check parity bits that are attached to the downlink control information format 3 are scrambled with a first radio network temporary identifier (RNTI), application timing for the transmission power control command is based on a first uplink-downlink configuration, and in which, in a case where the cyclic redundancy check parity bits that are attached to the downlink control information format 3 are scrambled with a second RNTI, application timing for the transmission power control command is based on a second uplink-downlink configuration.

(12) Furthermore, the base station device according to the aspect of the present invention may cause the base station device to perform the sequence of functions further including: a function of transmitting first information and second information, in which the first uplink-downlink configuration may be based on the first information and the second uplink-downlink configuration may be based on the second information.

Effects of the Invention

According to the aspects of the present invention, the terminal device can efficiently perform processing associated with the transmission power.

BRIEF DESCRIPTION OF THE DRAWINGS

FIG. 7 is a table illustrating one example of an UL-DL configuration according to the present embodiment.

FIG. 10 is a diagram illustrating a correspondence between a pair that is formed by the first UL reference UL-DL configuration for a different serving cell (a primary cell) and the first UL reference UL-DL configuration for a serving cell (a secondary cell), and the second UL reference UL-DL configuration for the secondary cell, according to the present embodiment.

FIG. 12 is a diagram illustrating a correspondence between a pair that is formed by the first DL reference UL-DL configuration for the primary cell and the first DL reference UL-DL configuration for the secondary cell, and the second DL reference UL-DL configuration for the secondary cell, according to the present embodiment.

FIG. 13 is a diagram illustrating a correspondence between a subframe n to which a PDCCH/EPDCCH/PHICH is allocated and a subframe n+k to which a PUSCH to which the PDCCH/EPDCCH/PHICH corresponds is allocated, according to the present embodiment.

FIG. 14 is a diagram illustrating the correspondence between the subframe n to which the PUSCH is allocated, and the subframe n+k to which the PHICH to which the PUSCH corresponds is allocated, according to the present embodiment.

FIG. 15 is a diagram illustrating a correspondence between a subframe n−k to which a PDSCH is allocated and the subframe n on which a HARQ-ACK to which the PDSCH corresponds is transmitted, according to the present embodiment.

FIG. 16 is a diagram illustrating a value of $K_{PUSCH}$ according to the present embodiment.

MODE FOR CARRYING OUT THE INVENTION

Embodiments of the present invention will be described below.

According to the present embodiment, multiple cells are set for a terminal device. A technology in which the terminal device performs communication through the multiple cells is referred to as cell aggregation or carrier aggregation. The present invention may be applied to each of the multiple cells that are set for the terminal device. Furthermore, the present invention may be applied to some of the multiple cells that are set. A cell that is set for the terminal device is also referred to as a serving cell.

Multiple serving cells that are set include one primary cell or one or multiple secondary cells. The primary cell is a cell in which an initial connection establishment procedure is performed, a serving cell in which a connection re-establishment procedure is started, or a cell that is prescribed as a primary cell during a handover procedure. At a point of time when an RRC connection is established, or later, the secondary cell may be set.

A Time Division Duplex (TDD) scheme is applied to a wireless communication system according to the present embodiment. In a case of the cell aggregation, the TDD scheme may be applied to all multiple cells. Furthermore, in the case of the cell aggregation, a cell to which the TDD scheme is applied and a cell to which a Frequency Division Duplex (FDD) scheme is applied may be aggregated. In the cell aggregation, the present invention can be applied to some of the cells.

Figure 1:
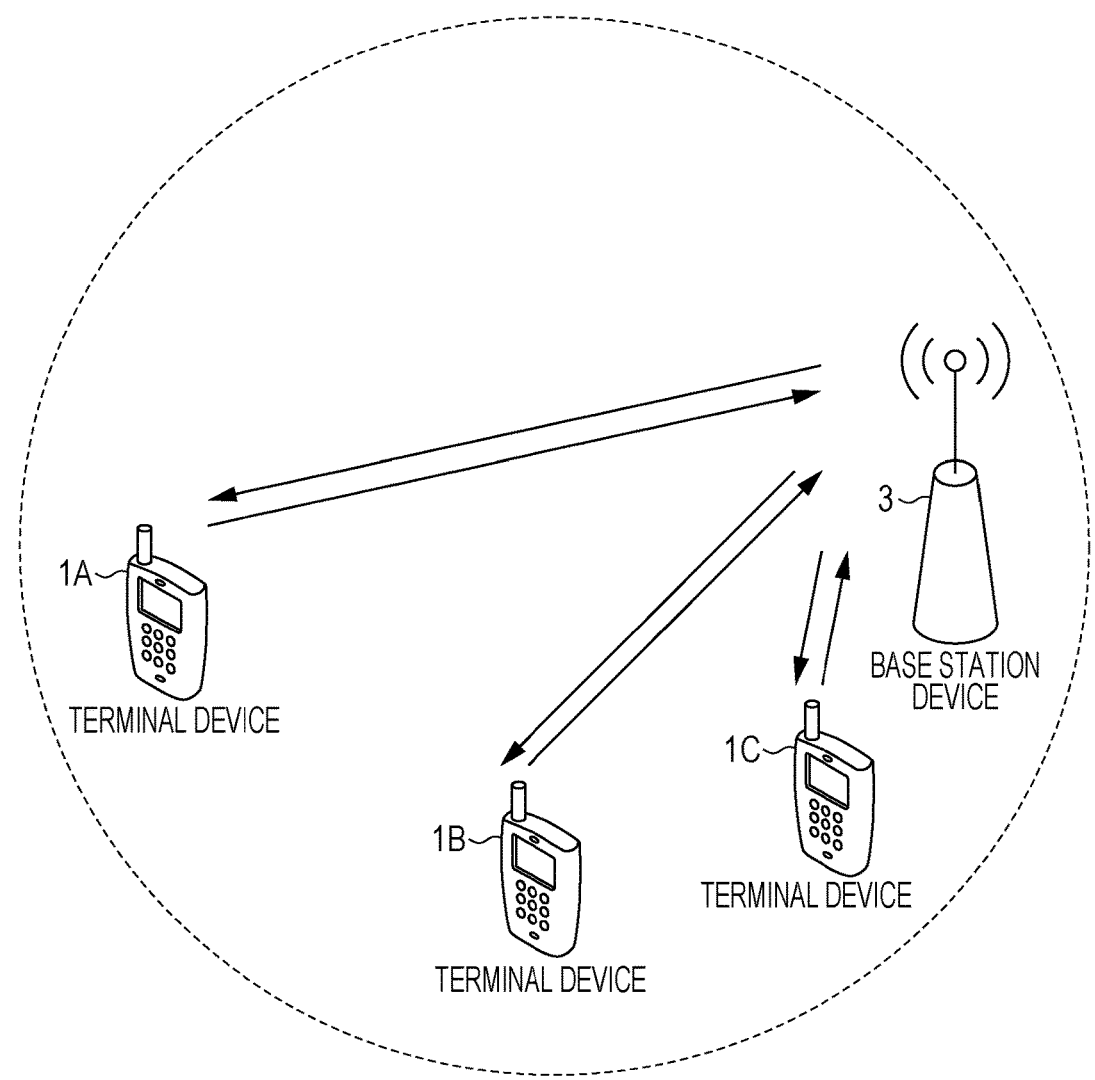
FIG. 1 is a conceptual diagram of a wireless communication system according to the present embodiment.

FIG. 1 is a conceptual diagram of the wireless communication system according to the present embodiment. In FIG. 1, the wireless communication system includes terminal devices 1A to 1C, and a base station device 3. The terminal devices 1A to 1C are hereinafter referred to as the terminal device 1.

A physical channel and a physical signal according to the present embodiment are described.

In FIG. 1, the following uplink physical channel is used for wireless communication for uplink from the terminal device 1 to the base station device 3. The uplink physical channel is used to transmit information that is output from a higher layer.

Physical Uplink Control Channel (PUCCH)
Physical Uplink Shared Channel (PUSCH)
Physical Random Access Channel (PRACH)

The PUCCH is a physical channel that is used to transmit uplink control information (UCI). The pieces of uplink control information include downlink channel state information (CSI), a scheduling request (SR) indicating a request for a PUSCH resource, and an acknowledgement (ACK)/negative-acknowledgement (NACK) of downlink data (a transport block or a downlink-shared channel (DL-SCH)). The ACK/NACK is also referred to as an HARQ-ACK, HARQ feedback, or response information.

The PUSCH is a physical channel that is used to transmit uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is a physical channel that is used to transmit a random access preamble. The PRACH is used to indicate the initial connection establishment procedure, the handover procedure, the connection re-establishment procedure, synchronization (timing adjustment) for uplink transmission, and the request for the PUSCH resource.

In FIG. 1, the following uplink physical signals are used for the uplink wireless communication. The uplink physical signal is not used to transmit the information from the higher layer, but is used by a physical layer.

Uplink Reference Signal (UL RS)

According to the present embodiment, the following two types of uplink reference signals are used.

Demodulation Reference Signal (DMRS)

Sounding Reference Signal (SRS)

The DMRS is associated with transmission of the PUSCH or the PUCCH. The DMRS is time-multiplexed along with the PUSCH or the PUCCH. The base station device 3 uses the DMRS in order to perform channel reconfiguration of the PUSCH or the PUCCH. Transmission of both of the PUSCH and the DMRS is hereinafter referred to simply as transmission of the PUSCH. Transmission of both of the PUCCH and the DMRS is hereinafter referred to as transmission of the PUCCH.

The SRS is not associated with the transmission of the PUSCH or the PUCCH. The base station device 3 uses the SRS in order to measure an uplink channel state. The terminal device 1 transmits a first SRS in a first resource that is set by the higher layer. Additionally, in a case where information indicating a request for transmission of the SRS is received through the PDCCH, the terminal device 1 transmits a second SRS only one time in a second resource that is set by the higher layer. The first SRS is also referred to as a periodic SRS or a type 0 trigger SRS. The second SRS is also referred to as an aperiodic SRS or a type 1 trigger SRS. Transmission of the aperiodic SRS is scheduled by the information indicating that the transmission of the SRS is requested.

In FIG. 1, the following downlink physical channel is used for wireless communication for downlink from the base station device 3 to the terminal device 1. The downlink physical channel is used to transmit the information that is output from the higher layer.

Physical Broadcast Channel (PBCH)

Physical Control Format Indicator Channel (PCFICH)

Physical Hybrid automatic repeat request Indicator Channel (PHICH)

Physical Downlink Control Channel (PDCCH)

Enhanced Physical Downlink Control Channel (EPDCCH)

Physical Downlink Shared Channel (PDSCH)

Physical Multicast Channel (PMCH)

The PBCH is used to broadcast a Master Information Block (MIB) (Broadcast Channel (BCH)) that is in common use in the terminal device 1.

The PCFICH is used to transmit information that indicates a region (an OFDM symbol) which is used for transmission of the PDCCH.

The PHICH is used to transmit an HARQ indicator (the HARQ feedback or the response information) that indicates an acknowledgement (ACK) of or a negative acknowledgement (NACK) of the uplink data (the uplink shared channel (UL-SCH)) which is received by the base station device 3.

The PDCCH and the EPDCCH are used to transmit downlink control information (DCI). The downlink control information is also referred to as the DCI format. Pieces of downlink control information include a DCI format 3, a DCI format 3A, a downlink grant, and an uplink grant. The downlink grant is also referred to as downlink assignment or downlink allocation.

The DCI format 3 and/or the DCI format 3A are also referred to as DCI format 3/3A. The DCI format 3/3A is used for transmission of multiple transmission power control (TPC) commands for the PUSCH of the primary cell or for transmission of multiple TPC commands for the PUCCH of the primary cell. One TPC command that is included in the DCI format 3 is two bits long. One TPC command that is included in the DCI format 3A is one bit long.

The base station device 3 transmits to the terminal device 1 the higher layer signal, which includes information indicating a value of TPC-PUSCH-RNTI, information indicating a parameter tpc-index that corresponds to TPC-PUSCH-RNTI, information indicating a value of TPC-PUCCH-RNTI, and information indicating a parameter tpc-index that corresponds to TPC-PUCCH-RNTI. The base station device 3 transmits to the terminal device 1 a higher layer signal that includes information indicating monitoring of the DCI format 3 or the DCI format 3A.

Cyclic redundancy check (CRC) parity bits are attached to the DCI format. The CRC parity bits that are attached to the DCI format 3/3A are scrambled with TPC-PUSCH-RNTI or TPC-PUSCH-RNTI.

In a case where the CRC parity bits that are attached to the DCI format 3/3A are scrambled with TPC-PUSCH-RNTI, the terminal device 1 determines that the DCI format 3/3A includes a TPC command for the PUSCH. In a case where the CRC parity bits that are attached to the DCI format 3/3A are scrambled with TPC-PUCCH-RNTI, the terminal device 1 determines that the DCI format 3/3A includes a TPC command for the PUCCH.

The DCI format 3/3A to which the CRC parity bits scrambled with TPC-PUSCH-RNTI are attached is also referred to as the DCI format 3/3A for the PUSCH. The DCI format 3/3A to which the CRC parity bits scrambled with TPC-PUCCH-RNTI are attached is also referred to as the DCI format 3/3A for the PUCCH.

Based on the parameter tpc-index that is given by the higher layer, the terminal device 1 determines an index for a TPC command for the terminal device 1.

The base station device 3 may transmit the DCI format 3/3A in a common search space (CSS) of the primary cell. The terminal device 1 may monitor the DCI format 3/3A in the CSS of the primary cell. The terminal device 1 may attempt to decode the PDCCH/EPDCCH for the DCI format 3/3A in the CSS of the primary cell.

The downlink grant is used for scheduling of a single PDSCH within a single cell. The downlink grant is used for the scheduling of the PDSCH within the same subframe as the subframe on which the downlink grant is transmitted. The downlink grant includes the TPC command for the PUCCH.

The uplink grant is used for scheduling of the PUSCH within a single cell. The uplink grant is used for the scheduling of a single PUSCH within the fourth or later subframe after the subframe on which the uplink grant is transmitted. The uplink grant includes the TPC command for the PUSCH.

The CRC parity bits that are attached to the downlink grant or the uplink grant are scrambled with a cell-radio network temporary identifier (C-RNTI) or a semi persistent scheduling cell-radio network temporary identifier (SPS C-RNTI). The C-RNTI and the SPS C-RNTI are identifiers for identifying a terminal device within a cell.

The C-RNTI is used to control the PDSCH or the PUSCH in a single subframe. The SPS C-RNTI is used to periodically allocate a resource for the PDSCH or the PUSCH.

The PDSCH is used for transmitting the downlink data (the downlink shared channel (DL-SCH)).

The PMCH is used to transmit multicast data (a multicast channel (MCH)).

In FIG. 1, the following downlink physical signals are used for the wireless communication for downlink. The downlink physical signal is not used to transmit the information that is output from the higher layer, but is used by the physical layer.

Synchronization signal (SS)

Downlink Reference Signal (DL RS)

The synchronization signal is used in order for the terminal device 1 to be synchronized to a frequency domain and a time domain for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform the channel reconfiguration of the downlink physical channel. The downlink reference signal is used in order for the terminal device 1 to calculate the downlink channel state information.

According to the present embodiment, the following five types of downlink reference signals are used.

Cell-specific Reference Signal (CRS)

UE-specific Reference Signal (URS) associated with the PDSCH

Demodulation Reference Signal (DMRS) associated with the EPDCCH

Non-Zero Power Channel State Information-Reference Signal (NZP CSI-RS)

Zero Power Channel State Information-Reference Signal (ZP CSI-RS)

Multimedia Broadcast and Multicast Service over Single Frequency Network Reference Signal (MBSFN RS)

Positioning Reference Signal (PRS)

The CRS is transmitted in an entire band for a subframe. The CRS is used to perform demodulation of the PBCH/PDCCH/PHICH/PCFICH/PDSCH. The CRS may be used in order for the terminal device 1 to calculate the downlink channel state information. The PBCH/PDCCH/PHICH/PCFICH is transmitted in an antenna port that is used for transmission of the CRS.

The URS associated with the PDSCH is transmitted on a subframe and in a band. The subframe and the band are used for transmission of the PDSCH with which the URS is associated. The URS is used to perform the demodulation of the PDSCH with which the URS is associated.

The PDSCH is transmitted in an antenna port that is used for transmission of the CRS or the URS. A DCI format 1A is used for the scheduling of the PDSCH that is transmitted in the antenna port which is used for the transmission of the CRS. A DCI format 2D is used for the scheduling of the PDSCH that is transmitted in the antenna port which is used for the transmission of the URS.

The DMRS associated with the EPDCCH is transmitted on a subframe and in a band. The subframe and the band are used for transmission of the EPDCCH with which the DMRS is associated. The DMRS is used to perform demodulation of the EPDCCH with which the DMRS is associated. The EPDCCH is transmitted in an antenna port that is used for transmission of the DMRS.

The NZP CSI-RS is transmitted on a subframe that is set. A resource on which the NZP CSI-RS is transmitted is set by a base station device. The NZP CSI-RS is used in order for the terminal device 1 to calculate the downlink channel state information. The terminal device 1 performs signal measurement (channel measurement) using the NZP CSI-RS.

A resource for the ZP CSI-RS is set by the base station device 3. With zero output, the base station device 3 transmits the ZP CSI-RS. To be more precise, the base station device 3 does not transmit the ZP CSI-RS. The base station device 3 does not transmit the PDSCH and the EPDCCH on a resource that is set for the ZP CSI-RS. For example, in a certain cell, the terminal device 1 can measure interference in a resource to which the NZP CSI-RS corresponds.

The MBSFN RS is transmitted in an entire band for a subframe that is used for transmission of the PMCH. The MBSFN RS is used to perform demodulation of the PMCH. The PMCH is transmitted in an antenna port that is used for transmission of the MBSFN RS.

The PRS is used in order for the terminal device to measure a geographical location of the terminal device itself.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel that is used in a Medium Access Control (MAC) layer is referred to as a transport channel. A unit of the transport channel that is used in the MACK layer is also referred to as a transport block (TB) or a MAC protocol data unit (PDU). Control of a hybrid automatic repeat request (HARQ) is performed for every transport block in the MAC layer. The transport block is a unit of data that the MAC layer delivers to the physical layer. In the physical layer, the transport block is mapped to a codeword, and coding processing is performed.

A configuration of the radio frame according to the present embodiment will be described below.

Figure 2:
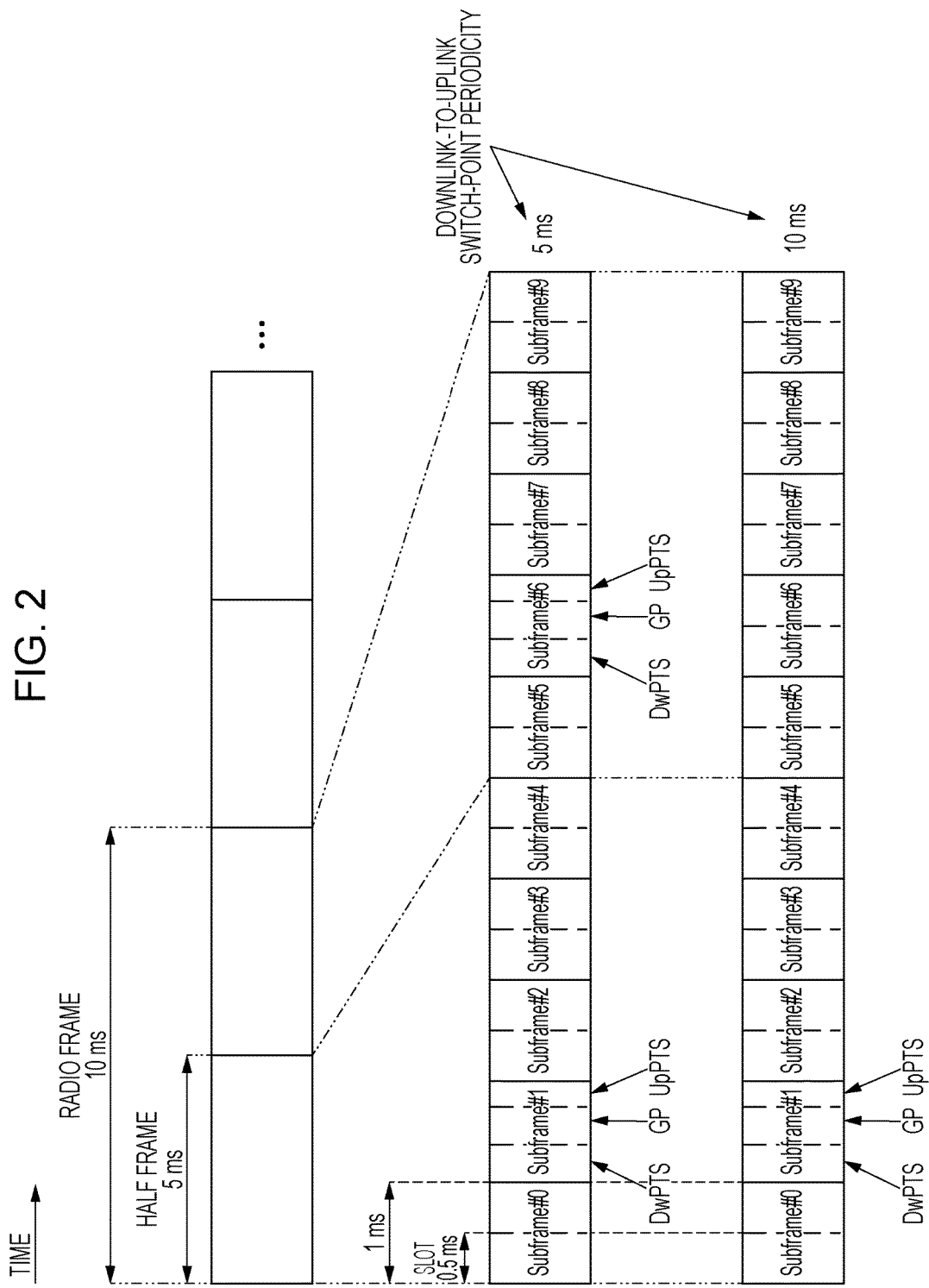
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms long. In FIG. 2, the horizontal axis is a time axis. Furthermore, radio frames are each configured from two half frames. Half frames are each 5 ms long. The half frames are each configured from 5 subframes. Subframes are each 1 ms long, and are defined by two consecutive slots. Each slot is 0.5 ms long. An i-th subframe within a radio frame is configured from a (2×i)-th slot and a (2×i+1)-th slot. To be more precise, 10 subframes can be used at intervals of 10 ms.

According to the present invention, the following 3 types of subframes are defined.

Downlink Subframe (a first subframe)

Uplink Subframe (a second subframe)

Special Subframe (a third subframe)

The downlink subframe is a subframe that is reserved for downlink transmission. The uplink subframe is a subframe that is reserved for uplink transmission. The special subframe is configured from three fields. The three fields are a downlink pilot time slot (DwPTS), a guard period (GP), and an uplink pilot time slot (UpPTS). A sum of lengths of the DwPTS, the GP, and the UpPTS is 1 ms long. The DwPTS is a field reserved for the downlink transmission. The UpPTS is a field reserved for the uplink transmission. The GP is a field in which the downlink transmission and the uplink transmission are not performed. Moreover, the special subframe may be configured only from the DwPTS and the GP, and may be configured only from the GP and the UpPTS.

A single radio frame is at least configured from the downlink subframe, the uplink subframe, and the special subframe.

A configuration of a slot according to the present embodiment will be described below.

Figure 3:
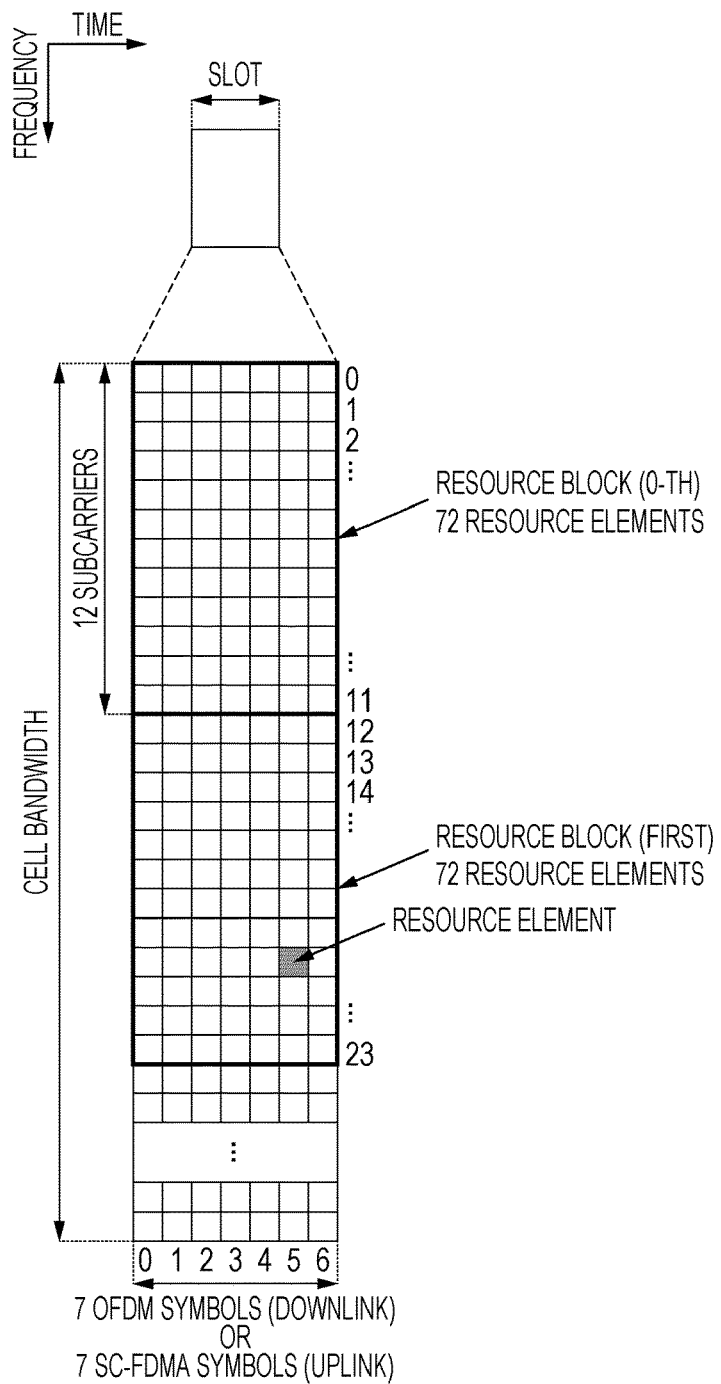
FIG. 3 is a diagram illustrating a configuration of a slot according to the present embodiment.

FIG. 3 is a diagram illustrating the configuration of the slot according to the present embodiment. According to the present embodiment, a normal cyclic prefix (CP) is applied to the OFDM symbol. Moreover, an extended cyclic prefix (CP) may be applied to the OFDM symbol. The physical signal or the physical channel that is transmitted on each of the slots is expressed by a resource grid. In FIG. 3, the horizontal axis is a time axis and the vertical axis is a frequency axis. In downlink, the resource grid is defined by multiple subcarriers and multiple OFDM symbols. In uplink, the resource grid is defined by multiple subcarriers and multiple SC-FDMA symbols. The number of subcarriers that construct one slot depends on a cell bandwidth. The number of OFDM symbols or SC-FDMA symbols that construct one slot is 7. Each of the elements within the resource grid is referred to as a resource element. The resource element is identified using a subcarrier number and an OFDM symbol or an SC-FDMA symbol number.

A resource block is used to express mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in a time domain and by 12 consecutive subcarriers in a frequency domain. Therefore, one physical resource block is configured from (7×12) resource elements. Furthermore, one physical resource block corresponds to one slot in the time domain, and corresponds to 180 kHz in the frequency domain. The physical resource blocks are numbered from 0 in the frequency domain.

The physical channel and the physical signal that are transmitted in each of the subframes will be described below.

Figure 4:
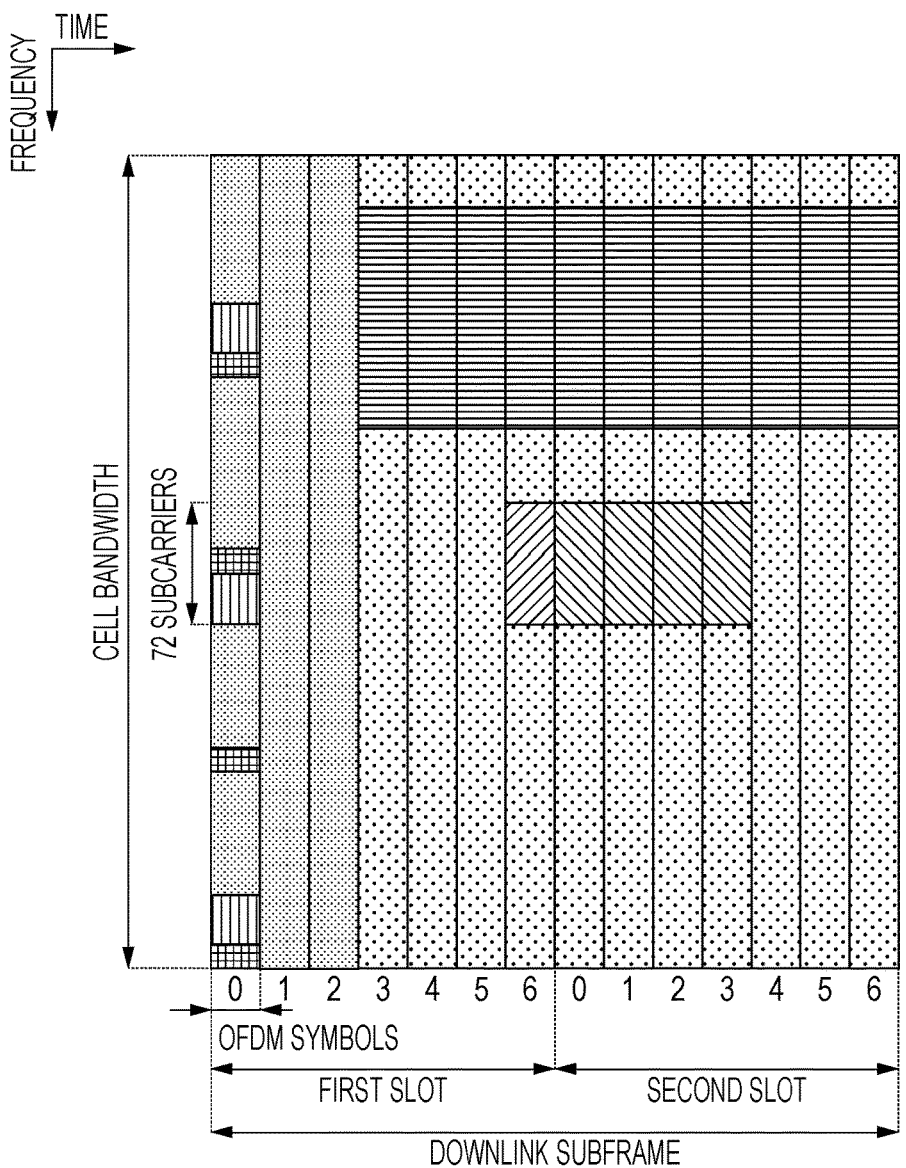
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal to the downlink subframe according to the present embodiment. In FIG. 4, the horizontal axis is a time axis and the vertical axis is a frequency axis. The base station device 3 may transmit the downlink physical channel (the PBCH, the PCFICH, the PHICH, the PDCCH, the EPDCCH, or the PDSCH), and the downlink physical signal (the synchronization signal or the downlink reference signal) on the downlink subframe. Moreover, the PBCH is transmitted only on subframe 0 within the radio frame. Moreover, the downlink reference signal is mapped to the resource elements that are distributed in the frequency domain and the time domain. The downlink reference signal is not illustrated in FIG. 4 for brief description.

Multiple PDCCHs may be frequency-multiplexed and time-multiplexed in a PDCCH region. Multiple EPDCCHs may be frequency-multiplexed, be time-multiplexed, and be space-multiplexed in an EPDCCH region. Multiple PDSCHs may be frequency-multiplexed and be time-multiplexed in a PDSCH region. The PDCCH and the PDSCH or the EPDCCH may be time-multiplexed. The PDSCH and the EPDCCH may be frequency-multiplexed.

Figure 5:
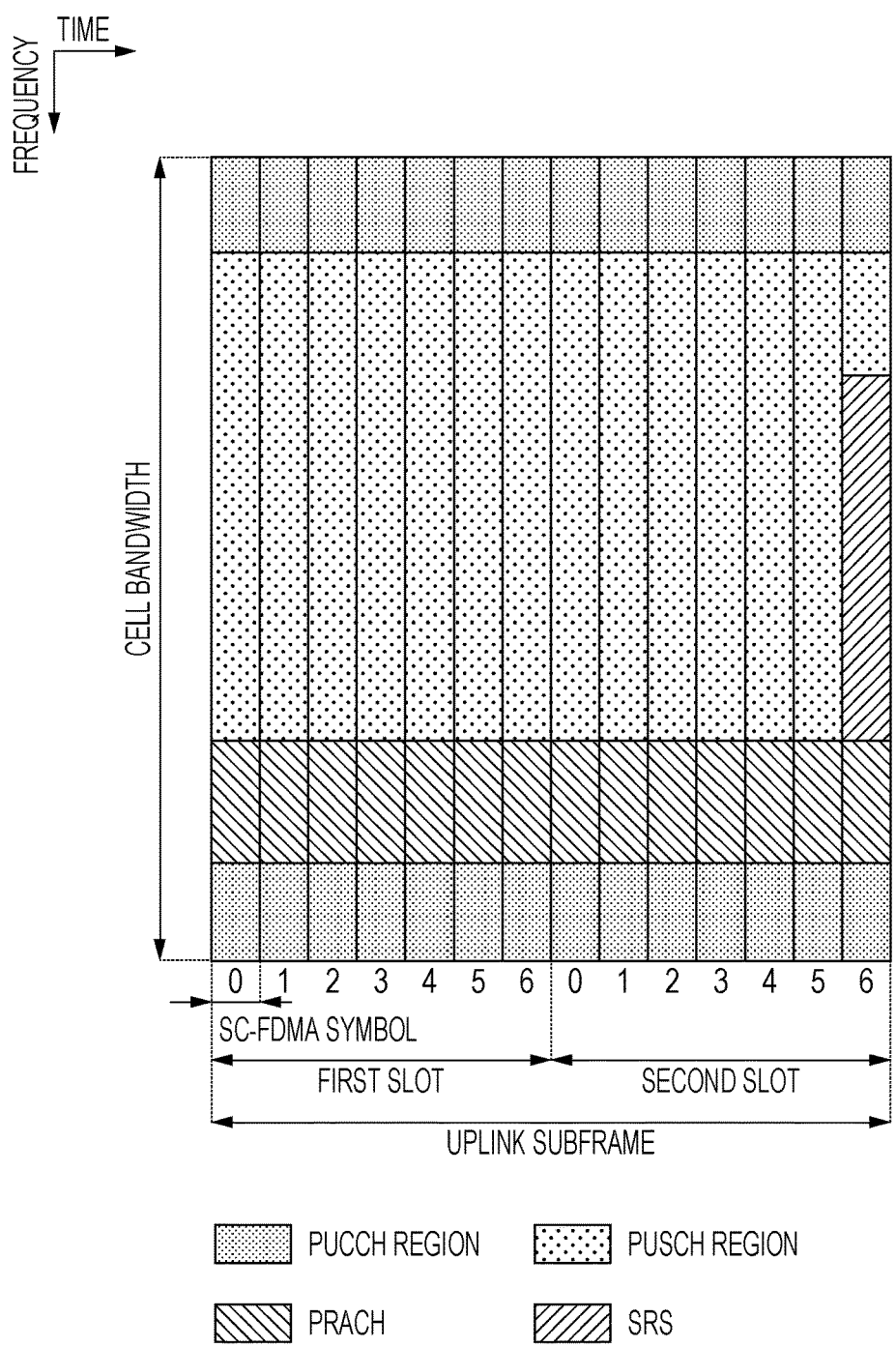
FIG. 5 is a diagram illustrating one example of the allocation of the physical channel and the mapping of the physical signal to an uplink subframe according to the present embodiment.

FIG. 5 is a diagram illustrating one example of the allocation of the physical channel and the mapping of the physical signal to the uplink subframe according to the present embodiment. In FIG. 5, the horizontal axis is a time axis and the vertical axis is a frequency axis. The terminal device 1 may transmit the uplink physical channel (the PUCCH, the PUSCH or the PRACH) and the uplink physical signal (the DMRS or the SRS) on the uplink subframe. In a PUCCH region, multiple PUCCHs are frequency-multiplexed, time-multiplexed, and code-multiplexed. In a PUSCH region, multiple PUSCHs are frequency-multiplexed and space-multiplexed. The PUCCH and the PUSCH may be frequency-multiplexed. The PRACH may be allocated over a single subframe or two subframes. Furthermore, multiple PRACHs may be code-multiplexed.

The SRS is transmitted using the last SC-FDMA symbol within the uplink subframe. To be more precise, the SRS is mapped to the last SC-FDMA symbol within the uplink subframe. The terminal device 1 cannot transmit the SRS and the PUCCH/PUSCH/PRACH at the same time on a single SC-FDMA symbol in a single cell. On a single uplink subframe in the single cell, the terminal device 1 can transmit the PUSCH and/or the PUCCH using the SC-FDMA symbol with the last SC-FDMA symbol within the uplink subframe being excluded, and can transmit the SRS using the last SC-FDMA symbol within the uplink subframe. To be more precise, on the single uplink subframe in the single cell, the terminal device 1 can transmit both of the SRS and the PUSCH/PUCCH at the same time. Moreover, the DMRS is time-multiplexed along with the PUCCH or the PUSCH. The DMRS is not illustrated in FIG. 5 for brief description.

Figure 6:
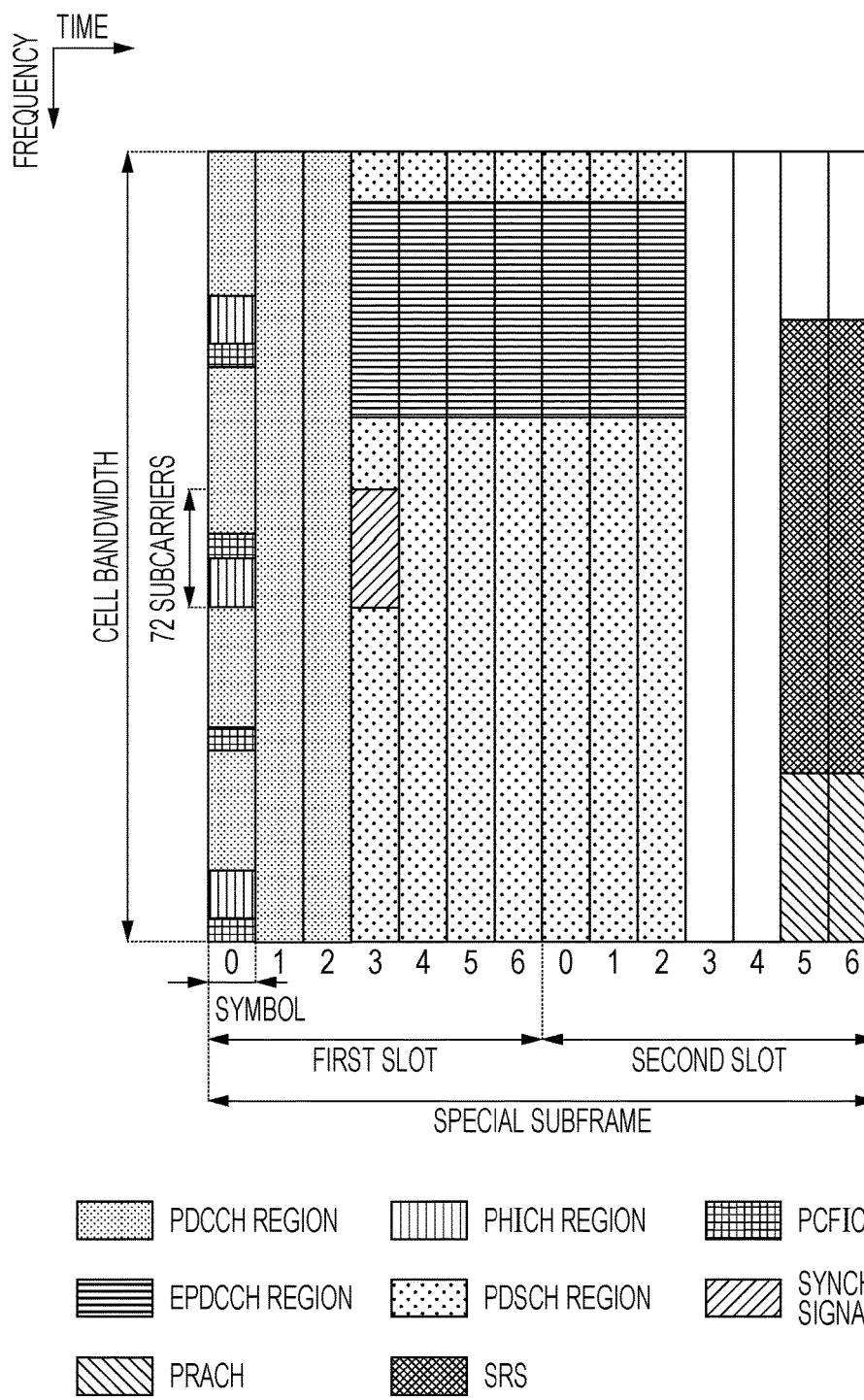
FIG. 6 is a diagram illustrating one example of the allocation of the physical channel and the mapping of the physical signal to a special subframe according to the present embodiment.

FIG. 6 is a diagram illustrating one example of the allocation of the physical channel and the mapping of the physical signals to the special subframe according to the present embodiment. In FIG. 6, the horizontal axis is a time axis and the vertical axis is a frequency axis. In FIG. 6, the DwPTS is configured from first to 10-th SC-FDMA symbols within the special subframe, the GP is configured from 11-th and 12-th SC-FDMA symbols within the special subframe, and the UpPTS is configured from 13-th and 14-th SC-FDMA symbols within the special subframe.

The base station device 3 may transmit the PCFICH, the PHICH, the PDCCH, the EPDCCH, the PDSCH, the synchronization signal, and the downlink reference signal, on the DwPTS of the special subframe. The base station device 3 may not transmit the PBCH on the DwPTS of the special subframe. The terminal device 1 may transmit the PRACH and the SRS on the UpPTS of the special subframe. To be more precise, the terminal device 1 does not transmit the PUCCH, the PUSCH, and the DMRS on the UpPTS of the special subframe.

A first uplink reference uplink-downlink configuration (UL reference UL-DL configuration), a first downlink reference uplink-downlink configuration (DL reference UL-DL configuration), a second UL reference UL-DL configuration, a second DL reference UL-DL configuration, and a transmission direction uplink-downlink configuration (transmission direction UL-DL configuration) will be described below.

The first UL reference UL-DL configuration, the first DL reference UL-DL configuration, the second UL reference UL-DL configuration, the second DL reference UL-DL configuration, and the transmission direction UL-DL configuration are defined by an uplink-downlink configuration (UL-DL configuration).

The UL-DL configuration is a configuration associated with a pattern of a subframe within the radio frame. That is, the UL-DL configuration indicates which subframe within the radio frame is a downlink subframe, an uplink subframe, or a special subframe.

To be more precise, the first UL reference UL-DL configuration, the second UL reference UL-DL configuration, the first DL reference UL-DL configuration, the second DL reference UL-DL configuration, and the transmission direction UL-DL configuration are defined by patterns of the downlink subframe, the uplink subframe, and the special subframe within the radio frame.

The patterns of the downlink subframe, the uplink subframe, and the special subframe indicate which of the downlink subframe, the uplink subframe, and the special subframe each of subframes #0 to #9 is, and are preferably expressed by arbitrary combinations of D, U, and S (which indicates the downlink subframe, the uplink subframe, and the special subframe, respectively), in each of which a sum of lengths of D, U, and S is 10. More preferably, the head subframe (to be more precise, subframe #0) is D, and the second subframe is S (to be more precise, subframe #1).

FIG. 7 is a table illustrating one example of the UL-DL configuration according to the present embodiment. In FIG. 7, D indicates a downlink subframe, U indicates an uplink subframe, and S indicates a special subframe.

Setting of a UL-DL configuration i as the first or second UL reference UL-DL configuration is referred to as setting of a first or second UL reference UL-DL configuration i. Setting of the UL-DL configuration i as the first or second DL reference UL-DL configuration is referred to as setting of a first or second DL reference UL-DL configuration i. Setting of the UL-DL configuration i as the transmission direction UL-DL configuration is referred to as a transmission direction UL-DL configuration.

A method will be described below in which the setting to each of the first UL reference UL-DL configuration, the first DL reference UL-DL configuration, and the transmission direction UL-DL configuration is provided.

The base station device 3 sets the first UL reference UL-DL configuration, the first DL reference UL-DL configuration, and the transmission direction UL-DL configuration. The base station device 3 may transmit the first information (TDD-Config) indicating the first UL reference UL-DL configuration, the second information indicating the first DL reference UL-DL configuration, and the third information indicating the transmission direction UL-DL configuration, with the first information, the second information, and the third information being included in at least one of an MIB, a system information block type 1 message, a system information message, an RRC message, a MAC control element (CE), and physical layer control information (for example, a DCI format). Furthermore, the base station device 3 may include the first information, the second information, and the third information in any one of the MIB, the system information block type 1 message, the system information message, the RRC message, the MAC control element (CE), and the physical layer control information (for example, the DCI format), depending on a situation.

For each of the multiple serving cells, the first UL reference UL-DL configuration, the second UL reference UL-DL configuration, the first DL reference UL-DL configuration, the second DL reference UL-DL configuration, and the transmission direction UL-DL configuration may be defined.

The base station device 3 transmits the first information, the second information, and the third information to the terminal device 1 for which multiple serving cells are set. Moreover, for each of the serving cells, the first information, the second information, and the third information may be defined.

Moreover, for each of the serving cells, the first information, the second information, and the third information may be defined. The terminal device 1 for which multiple serving cells are set may set the first UL reference UL-DL configuration, the first DL reference UL-DL configuration, and the transmission direction DL-UL configuration for each of the serving cells, based on the first information, the second information, and the third information.

The first information for the primary cell is desirably included in the system information block type 1 message or the RRC message. The first information for the secondary cell is desirably included in the RRC message. The second information for the primary cell is desirably included in the system information block type 1 message, the system information message, or the RRC message. The second information for the secondary cell is desirably included in the RRC message. The third information is desirably included in the physical layer control information (for example, the DCI format).

Initial transmission of a system information block type 1 message is performed through the PDSCH on subframe 5 of a radio frame that satisfies SFN mod 8=0, and re-transmission (repetition) thereof is performed on subframe 5 of a different radio frame that satisfies SFN mod 2=0. The system information block type 1 message includes information indicating a configuration (lengths of the DwPTS, the GP, and the UpPTS) of a special subframe. The system information block type 1 message is cell-specific information.

The system information message is transmitted through the PDSCH. The system information message is cell-specific information. The system information message includes a system information block X other than the system information block type-1.

The RRC message is transmitted through the PDSCH. The RRC message is information or a signal in an RRC layer. The RRC message may be common to multiple terminal devices 1 within a cell, and may be dedicated to a specific terminal device 1.

The MAC CE is transmitted through the PDSCH. The MAC CE is information or a signal that is processed in the MAC layer.

Figure 8:
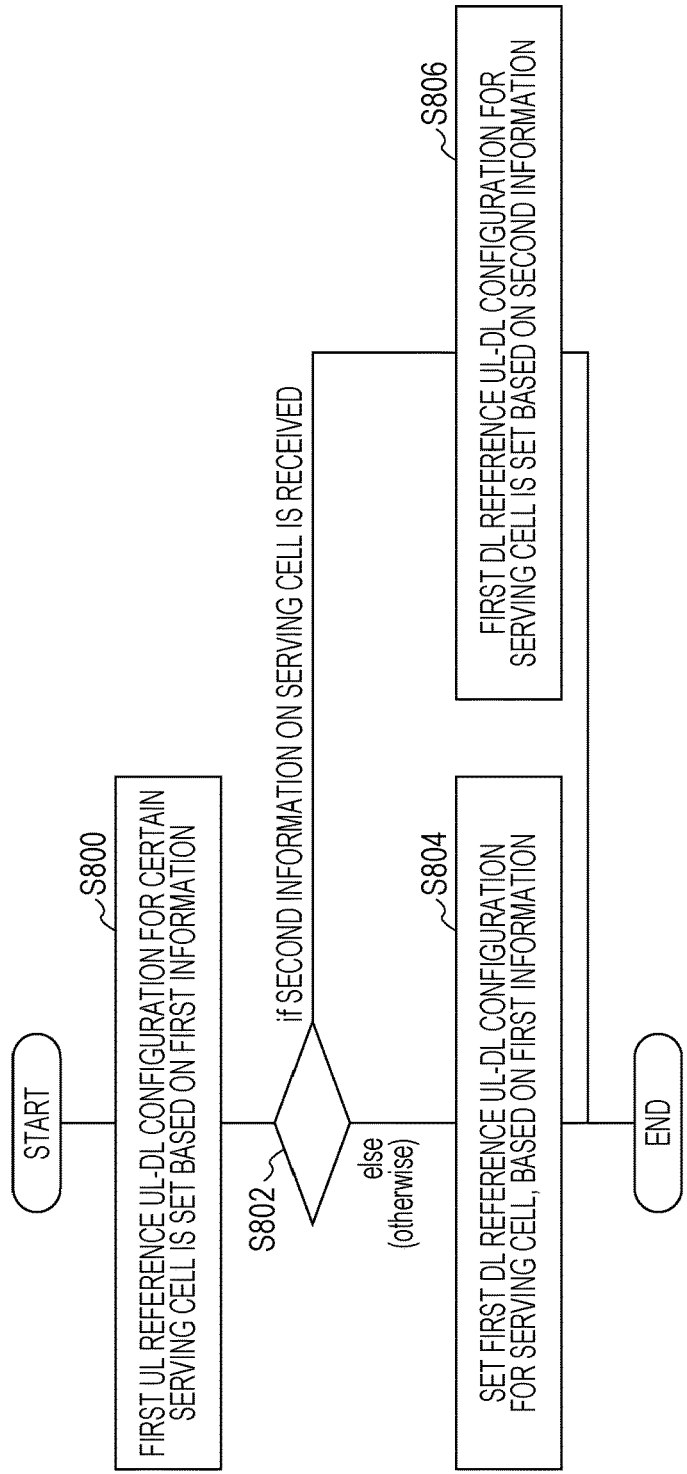
FIG. 8 is a flowchart illustrating a method of setting a first UL reference UL-DL configuration and a first DL reference UL-DL configuration according to the present embodiment.

FIG. 8 is a flowchart illustrating a method of setting the first UL reference UL-DL configuration and the first DL reference UL-DL configuration according to the present embodiment. The terminal device 1 performs a setting method in FIG. 8 on each of the multiple serving cells.

The terminal device 1 sets the first UL reference UL-DL configuration for a certain serving cell based on the first information (S800). The terminal device 1 determines whether or not the second information for the certain serving cell is received (S802). In a case where the second information for the certain serving cell is received, the terminal device 1 sets the first DL reference UL-DL configuration for the certain serving cell, based on the second information for the certain serving cell (S806). In a case where the second information for the certain serving cell is not received (else/otherwise), the terminal device 1 sets the first DL reference UL-DL configuration for the certain serving cell, based on the first information for the certain serving cell (S804).

The serving cell for which the first UL reference UL-DL configuration and the first DL reference UL-DL configuration are set based on the first information is also referred to as a serving cell for which dynamic TDD is not set. The serving cell for which the first DL reference UL-DL configuration is set based on the second information is also referred to as a serving cell for which the dynamic TDD is set.

Furthermore, in a case where the second information for a serving cell is not received, the first UL reference UL-DL configuration and the first DL reference UL-DL configuration may not be defined. In the case where the second information for a certain serving cell is not received, the terminal device 1 may set one UL-DL configuration for the certain serving cell, based on the first information for the certain serving cell.

The terminal device 1 receives the second information and, based on the second information, determines a subframe that is available for transmission of an uplink signal. Next, the terminal device 1 monitors the third information. In a case where the third information is received, the terminal device 1 determines the subframe that is available for the transmission of the uplink signal based on the third information.

For example, the base station device 3 transmits the third information to the terminal device 1 using the PDCCH/EPDCCH. Based on the third information, a dynamic TDD operation is performed within a coverage that is provided by the base station device 3 (a cell). The third information may be transmitted and received in a common search space (CSS) or a UE-specific search space (USS). The CSS is a region in which multiple terminal devices 1 perform monitoring of the PDCCH/EPDCCH together. The USS is a region that is defined based on at least the C-RNTI.

The terminal device 1 attempts to decode the received signal, and determines whether or not the PDCCH/EPDCCH that includes the third information is detected. In a case where the PDCCH/EPDCCH that includes the third information is detected, the terminal device 1 determines the subframe that is available for the transmission of the uplink signal, based on the detected third information. In a case where the PDCCH/EPDCCH that includes the third information is not detected, the terminal device 1 may maintain the determination so far made as to the subframe that is available for the transmission of the uplink signal.

A method of setting the second UL reference UL-DL configuration will be described below.

In a case where multiple serving cells are set for the terminal device 1 and the first UL reference UL-DL configurations for at least two serving cells are different from each other, the terminal device 1 and the base station device 3 set the second UL reference UL-DL configuration.

In a case other than the case where multiple serving cells are set for the terminal device 1 and the first UL reference UL-DL configurations for at least two serving cells are different from each other, the terminal device 1 and the base station device 3 may not set the second UL reference UL-DL configuration.

A case other than the case where the first UL reference UL-DL configurations for at least two serving cells are different from each other is when the first UL reference UL-DL configurations for all the serving cells are the same. In the case where one serving cell is set for the terminal device 1, the terminal device 1 and the base station device 3 may not set the second UL reference UL-DL configuration.

Figure 9:
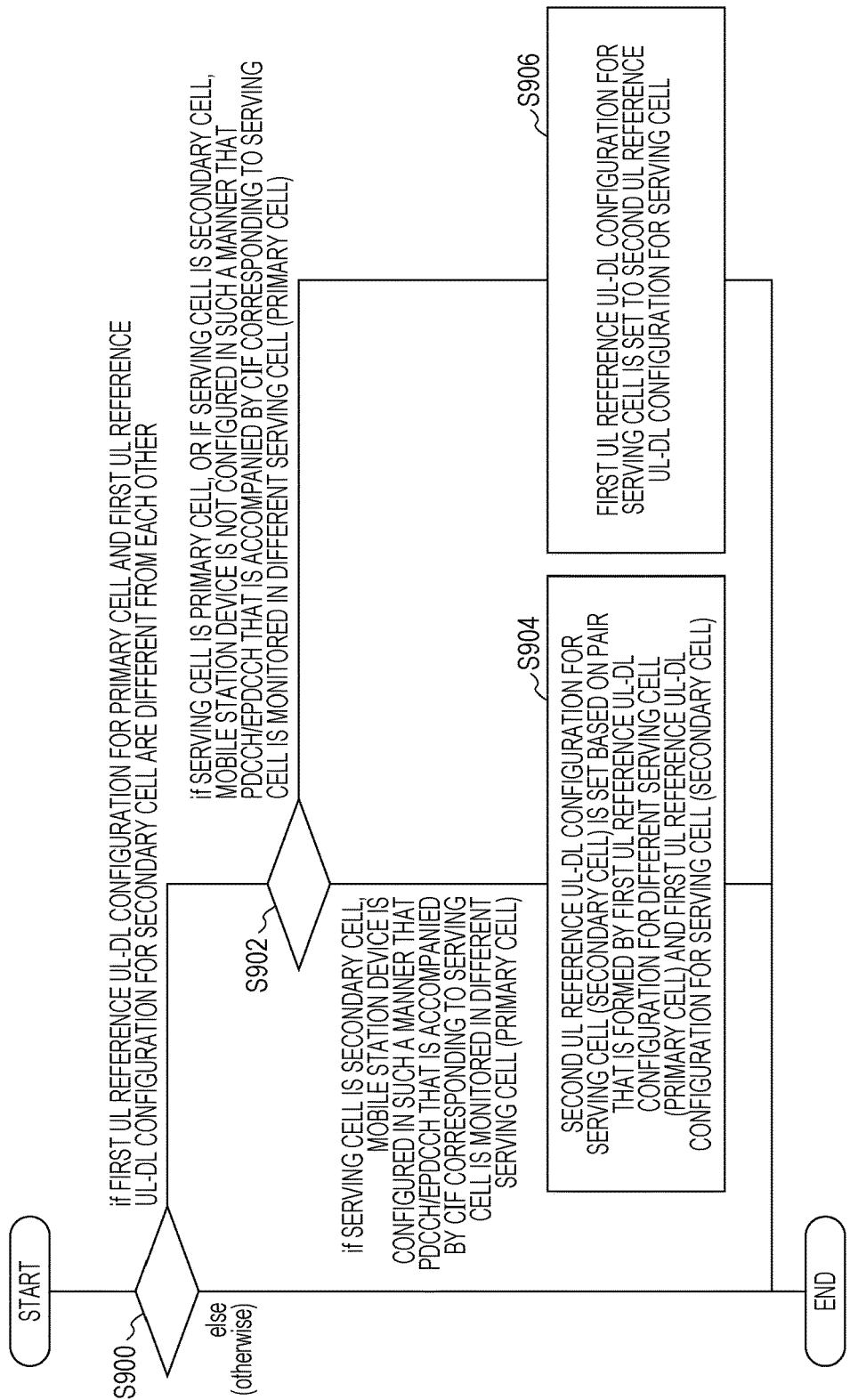
FIG. 9 is a flowchart illustrating a method of setting a second UL reference UL-DL configuration according to the present embodiment.

FIG. 9 is a flowchart illustrating a method of setting the second UL reference UL-DL configuration according to the present embodiment. In FIG. 9, one primary cell and one secondary cell are set for the terminal device 1. The terminal device 1 performs the setting method in FIG. 9 on each of the primary cell and the secondary cell.

The terminal device 1 determines whether or not the first UL reference UL-DL configuration for the primary cell and the first UL reference UL-DL configuration for the secondary cell are different from each other (S900). In a case where the first UL reference UL-DL configuration for the primary cell and the first UL reference UL-DL configuration for the secondary cell are the same, the terminal device 1 ends processing that sets the second UL reference UL-DL configuration, without setting the second UL reference UL-DL configuration.

In a case where the first UL reference UL-DL configuration for the primary cell and the first UL reference UL-DL for the secondary cell are different from each other, the terminal device 1 determines whether the serving cell is a primary cell or a secondary cell, and/or whether the setting is provided in a different serving cell in such a manner that the PDCCH/EPDCCH that is accompanied by a carrier indicator field (CIF) that corresponds to the serving cell is monitored (S902).

In a case where the serving cell is a secondary cell, and, in a different serving cell (a primary cell), the terminal device 1 is set in such a manner as to monitor the PDCCH/EPDCCH which is accompanied by the CIF that corresponds to the serving cell (the secondary cell), the second UL reference UL-DL configuration for the serving cell (the secondary cell) is set based on a pair that is formed by the first UL reference UL-DL configuration for the different serving cell (the primary cell) and the first UL reference UL-DL configuration for the serving cell (the secondary cell) (S904).

In S904, the terminal device 1 sets the second UL reference UL-DL configuration for the serving cell (the secondary cell) based on a table in FIG. 10. FIG. 10 is a diagram illustrating a correspondence between the pair that is formed by the first UL reference UL-DL configuration for the different serving cell (the primary cell) and the first UL reference UL-DL configuration for the serving cell (the secondary cell), and the second UL reference UL-DL configuration for the secondary cell, according to the present embodiment.

In FIG. 10, a UL-DL configuration for the primary cell refers to the first UL reference UL-DL configuration for the different serving cell (the primary cell). In FIG. 10, a UL-DL configuration for the secondary cell refers to the first uplink reference UL-DL configuration for the serving cell (the secondary cell).

For example, in a case where first UL reference UL-DL configuration 0 is set for the different serving cell (the primary cell) and first UL reference UL-DL configuration 2 is set for the serving cell (the secondary cell), second UL reference UL-DL configuration 1 is set for the secondary cell.

In a case where the serving cell is a primary cell, or the serving cell is a secondary cell, and, in a different cell (the primary cell), the terminal device 1 is not set in such a manner as to monitor the PDCCH/EPDCCH that is accompanied by the CIF which corresponds to the serving cell (the secondary cell), the first UL reference UL-DL configuration for the serving cell is set to the second UL reference UL-DL configuration for the serving cell (S906).

The base station device 3 sets the second UL reference UL-DL configuration based on the setting method in FIG. 9.

The monitoring of the PDCCH/EPDCCH that is accompanied by the CIF means attempting to decode the PDCCH or the EPDCCH according to the DCI format that includes the CIF. The CIF is a field to which a carrier indicator is mapped. A value of the carrier indicator indicates a serving cell to which the DCI format with which the carrier indicator is associated corresponds.

The terminal device 1 that is set in such a manner as to monitor the PDCCH/EPDCCH that is accompanied by the CIF which corresponds to a serving cell in a different serving cell monitors the PDCCH/EPDCCH that is accompanied by the CIF in the different serving cell.

The terminal device 1 that is set in such a manner as to monitor the PDCCH/EPDCCH which is accompanied by the CIF that corresponds to a serving cell in a different serving cell desirably receives the third information for the serving cell through the PDCCH/EPDCCH in the different serving cell.

The terminal device 1 that is not set in such a manner as to monitor the PDCCH/EPDCCH that is accompanied by the CIF which corresponds to a serving cell in the different serving cell monitors the PDCCH/EPDCCH that is accompanied by the CIF or is not accompanied by the CIF in the serving cell.

The terminal device 1 that is not set in such a manner as to monitor the PDCCH/EPDCCH which is accompanied by the CIF that corresponds to a serving cell in a different serving cell desirably receives the third information for the serving cell through the PDCCH/EPDCCH in the different serving cell.

The PDCCH/EPDCCH for the primary cell is transmitted in the primary cell. The third information for the primary cell is desirably transmitted through the PDCCH/EPDCCH in the primary cell.

The base station device 3 transmits to the terminal device 1 a parameter (cif-Presence-r10) indicating whether or not the CIF is included in the DCI format that is transmitted in the primary cell.

For each of the secondary cells, the base station device 3 transmits to the terminal device 1 a parameter (CrossCarrierSchedulingConfig-r10) associated with cross carrier scheduling.

The parameter (CrossCarrierSchedulingConfig-r10) includes a parameter (schedulingCellInfo-r10) indicating whether or not the PDCCH/EPDCCH that corresponds to an associated secondary cell is transmitted in the secondary cell or is transmitted in a different cell.

In a case where the parameter (schedulingCellInfo-r10) indicates that the PDCCH/EPDCCH which corresponds to the associated secondary cell is transmitted in the secondary cell, the parameter (schedulingCellInfo-r10) includes a parameter (cif-Presence-r10) indicating whether or not the CIF is included in the DCI format that is transmitted in the secondary cell.

In a case where the parameter (schedulingCellInfo-r10) indicates that the PDCCH/EPDCCH which corresponds to the associated secondary cell is transmitted in a different serving cell, the parameter (schedulingCellInfo-r10) includes a parameter (schedulingCellId) indicating which serving cell the downlink allocation for the associated secondary cell is sent in.

A method of setting the second DL reference UL-DL configuration will be described below.

In a case where multiple serving cells are set for the terminal device 1 and the first DL reference UL-DL configurations for at least two serving cells are different from each other, the terminal device 1 and the base station device 3 set the second DL reference UL-DL configuration. In a case other than the case where multiple serving cells are set for the terminal device 1 and the first DL reference UL-DL configurations for at least two serving cells are different from each other, the terminal device 1 and the base station device 3 may not set the second DL reference UL-DL configuration.

A case other than the case where the first DL reference UL-DL configurations for at least two serving cells are different from each other is when the first DL reference UL-DL configurations for all the serving cells are the same. In the case where one serving cell is set for the terminal device 1, the terminal device 1 and the base station device 3 may not set the second DL reference UL-DL configuration.

Figure 11:
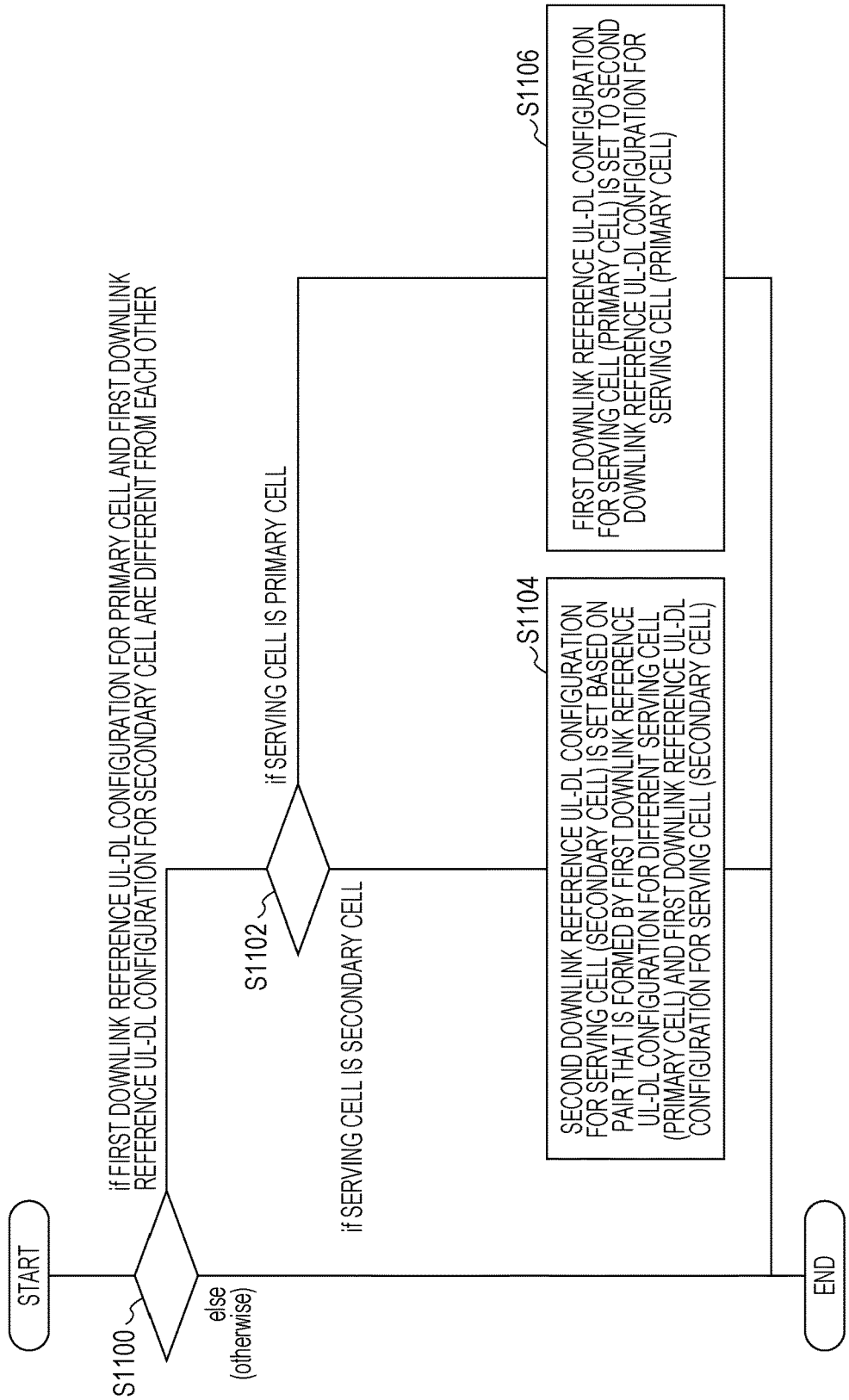
FIG. 11 is a flowchart illustrating a method of setting a second DL reference UL-DL configuration according to the present embodiment.

FIG. 11 is a flowchart illustrating a method of setting the second DL reference UL-DL configuration according to the present embodiment. In FIG. 11, one primary cell and one secondary cell are set for the terminal device 1. The terminal device 1 performs the setting method in FIG. 11 on each of the primary cell and the secondary cell.

The terminal device 1 determines whether or not the first DL reference UL-DL configuration for the primary cell and the first DL reference UL-DL configuration for the secondary cell are different from each other (S1100). In a case where the first DL reference UL-DL configuration for the primary cell and the first DL reference UL-DL configuration for the secondary cell are the same, the terminal device 1 ends processing that sets the second DL reference UL-DL configuration, without setting the second DL reference UL-DL configuration.

In a case where the first DL reference UL-DL configuration for the primary cell and the first DL reference UL-DL configuration for the second cell are different from each other, the terminal device 1 determines whether or not the serving cell is a primary cell or a secondary cell (S1102).

In a case where the serving cell is a secondary cell, the second UL reference UL-DL configuration for the serving cell (the secondary cell) is set based on the pair that is formed by the first DL reference UL-DL configuration for the different serving cell (the primary cell) and the first DL reference UL-DL configuration for the serving cell (the secondary cell) (S1104).

In S1104, the terminal device 1 sets the second DL reference UL-DL configuration for the serving cell (the secondary cell) based on a table in FIG. 12. FIG. 12 is a diagram illustrating a correspondence between a pair that is formed by the first DL reference UL-DL configuration for the primary cell and the first DL reference UL-DL configuration for the secondary cell, and the second DL reference UL-DL configuration for the secondary cell, according to the present embodiment.

In FIG. 12, the UL-DL configuration for the primary cell refers the first DL reference UL-DL configuration for the primary cell. In FIG. 12, the UL-DL configuration for the secondary cell refers to the first DL reference UL-DL configuration for the secondary cell.

In a case where the pair that is formed by the first DL reference UL-DL configuration for the primary cell and the first DL reference UL-DL configuration for the secondary cell belongs to set 1 in FIG. 12, the second DL reference UL-DL configuration for the secondary cell is defined in set 1.

In a case where, in the primary cell, the terminal device 1 is not set in such a manner as to monitor the PDCCH/EPDCCH that is accompanied by the CIF which corresponds to the secondary cell, and the pair that is formed by the first DL reference UL-DL configuration for the primary cell and the first DL reference UL-DL configuration for the secondary cell belongs to set 2 in FIG. 12, the second DL reference UL-DL configuration for the secondary cell is defined in set 2.

In a case where, in the primary cell, the terminal device 1 is not set in such a manner as to monitor the PDCCH/EPDCCH that is accompanied by the CIF which corresponds to the secondary cell, and the pair that is formed by the first DL reference UL-DL configuration for the primary cell and the first DL reference UL-DL configuration for the secondary cell belongs to set 3 in FIG. 12, the second DL reference UL-DL configuration for the secondary cell is defined in set 3.

In a case where, in the primary cell, the terminal device 1 is set in such a manner as to monitor the PDCCH/EPDCCH that is accompanied by the CIF which corresponds to the secondary cell, and the pair that is formed by the first DL reference UL-DL configuration for the primary cell and the first DL reference UL-DL configuration for the secondary cell belongs to set 4 in FIG. 12, the second DL reference UL-DL configuration for the secondary cell is defined in set 4.

In a case where, in the primary cell, the terminal device 1 is set in such a manner as to monitor the PDCCH/EPDCCH that is accompanied by the CIF which corresponds to the secondary cell, and the pair that is formed by the first DL reference UL-DL configuration for the primary cell and the first DL reference UL-DL configuration for the secondary cell belongs to set 5 in FIG. 12, the second DL reference UL-DL configuration for the secondary cell is defined in set 5.

For example, in a case where first DL reference UL-DL configuration 1 is set for the primary cell and first DL reference UL-DL configuration 0 is set for the serving cell, second DL reference UL-DL configuration 1 is set for the secondary cell.

In a case where the serving cell is a primary cell, the first DL reference UL-DL configuration for the serving cell (the primary cell) is set to the second DL reference UL-DL configuration for the serving cell (the primary cell) (S1106).

Moreover, the base station device 3 sets the second DL reference UL-DL configuration based on the setting method in FIG. 11.

The first UL reference UL-DL configuration will be described below.

The first UL reference UL-DL configuration is at least used for specifying a subframe that is available or is not available for uplink transmission in the serving cell.

The terminal device 1 does not perform the uplink transmission on the subframe that is indicated, as the downlink subframe, by the first UL reference UL-DL configuration. The terminal device 1 does not perform the uplink transmission on the DwPTS and the GP of the subframe that is indicated, as the special subframe, by the first UL reference UL-DL configuration.

The first DL reference UL-DL configuration will be described below.

The first DL reference UL-DL configuration is at least used for specifying a subframe that is available or is not available for downlink transmission in the serving cell.

The terminal device 1 does not perform the downlink transmission on the subframe that is indicated, as the uplink subframe, by the first DL reference UL-DL configuration. The terminal device 1 does not perform the downlink transmission on the UpPTS and the GP of the subframe that is indicated, as the special subframe, by the first DL reference UL-DL configuration.

The terminal device 1 that sets the first DL reference UL-DL configuration based on the first information may perform measurement (for example, measurement associated with the channel state information) that uses the downlink signal in the DwPTS of the downlink subframe or the special subframe that is indicated by the first UL reference UL-DL configuration or the first DL reference UL-DL configuration.

The subframe that is indicated as the uplink subframe by the first UL reference UL-DL configuration and that is indicated as the downlink subframe by the first DL reference UL-DL configuration is also referred to as a first flexible subframe. The first flexible subframe is a subframe that is reserved for the uplink and downlink transmission.

The subframe that is indicated as the special subframe by the first UL reference UL-DL configuration and that is indicated as the downlink subframe by the first DL reference UL-DL configuration is also referred to as a second flexible subframe. The second flexible subframe is a subframe that is reserved only for the downlink transmission. The second flexible subframe is a subframe that is reserved for the downlink transmission on the DwPTS and the uplink transmission on the UpPTS.

The transmission direction UL-DL configuration will be described in detail below.

The terminal device 1 and the base station device 3 set the transmission direction UL-DL configuration associated with a transmission direction (uplink/downlink) in the subframe. The transmission direction UL-DL configuration is used to determine the transmission direction in the subframe.

The terminal device 1 controls transmission on the first flexible subframe and the second flexible subframe based on the scheduling information (the DCI format and/or the HARQ-ACK) and the transmission direction UL-DL configuration.

The base station device 3 transmits to the terminal device 1 the third information that indicates the transmission direction UL-DL configuration. The third information is information that indicates a subframe which is available for the uplink transmission. The third information is information that indicates a subframe which is available for the downlink transmission. The third information is information that indicates a subframe which is available for the uplink transmission on the UpPTS and for the downlink transmission on the DwPTS. The transmission direction UL-DL configuration is used to specify the transmission direction in the subframe that is indicated as a subframe that differs between the first UL reference UL-DL configuration and the first DL reference UL-DL configuration.

The base station device 3 may perform scheduling of the downlink transmission on the subframe that is indicated, as the downlink subframe, by the transmission direction UL-DL configuration. The terminal device 1 may perform processing that receives the downlink signal on the subframe that is indicated, as the downlink subframe, by the transmission direction UL-DL configuration.

The base station device 3 may perform scheduling of the uplink transmission on the subframe that is indicated, as the uplink subframe, by the transmission direction UL-DL configuration. The terminal device 1 may perform processing that transmits the uplink signal on the subframe that is indicated, as the uplink subframe, by the transmission direction UL-DL configuration.

The base station device 3 may perform the scheduling of the downlink transmission on the DwPTS of the subframe that is indicated, as the special subframe, by the transmission direction UL-DL configuration. The terminal device 1 may perform the processing that receives the downlink signal on the DwPTS of the subframe that is indicated, as the special subframe, by the transmission direction UL-DL configuration.

The base station device 3 may perform the scheduling of the transmission of the SRS on the UpPTS of the subframe that is indicated, as the special subframe, by the transmission direction UL-DL configuration. The terminal device 1 may perform the processing that transmits the SRS on the UpPTS of the subframe that is indicated, as the special subframe, by the transmission direction UL-DL configuration.

The first UL reference UL-DL configuration and the second UL reference UL-DL configuration will be described in detail below.

The first UL reference UL-DL configuration and the second UL reference UL-DL configuration are used to specify (select or determine) a correspondence between a subframe n to which the PDCCH/EPDCCH/PHICH is allocated and a subframe n+k to which the PUSCH to which the PDCCH/EPDCCH/PHICH corresponds is allocated.

In a case where one primary cell is set, or in a case where one primary cell and one secondary cell are set and the first UL reference UL-DL configuration for the primary cell and the first UL reference UL-DL configuration for the secondary cell are the same, in each of the two serving cells, the corresponding first UL reference UL-DL configuration is used to determine a correspondence between a subframe to which the PDCCH/EPDCCH/PHICH is allocated and a subframe to which the PUSCH to which the PDCCH/EPDCCH/PHICH corresponds is allocated.

In a case where one primary cell and one secondary cell are set, and the first UL reference UL-DL configuration for the primary cell and the first UL reference UL-DL configuration for the secondary cell are different from each other, in each of the two serving cells, the corresponding second UL reference UL-DL configuration is used to determine the correspondence between the subframe to which the PDCCH/EPDCCH/PHICH is allocated and the subframe to which the PUSCH to which the PDCCH/EPDCCH/PHICH corresponds is allocated.

FIG. 13 is a diagram illustrating the correspondence between the subframe n to which the PDCCH/EPDCCH/PHICH is allocated and the subframe n+k to which the PUSCH to which the PDCCH/EPDCCH/PHICH corresponds is allocated, according to the present embodiment. The terminal device 1 specifies (selects or determines) a value k in accordance with a table in FIG. 13.

In FIG. 13, in the case where one primary cell is set, or in the case where one primary cell and one secondary cell are set and the first UL reference UL-DL configuration for the primary cell and the first UL reference UL-DL configuration for the secondary cell are the same, the UL-DL configuration refers to the first UL reference UL-DL configuration.

In FIG. 13, in the case where one primary cell and one secondary cell are set and the first UL reference UL-DL configuration for the primary cell and the first UL reference UL-DL configuration for the secondary cell are different from each other, the UL-DL configuration refers to the second UL reference UL-DL configuration.

The first UL reference UL-DL configuration and the second UL reference UL-DL configuration will be hereinafter briefly referred to as the UL-DL configuration when descriptions thereof are provided referring to FIG. 13.

In a case where, in the subframe n, the PDCCH/EPDCCH that is accompanied by an uplink grant that corresponds to the serving cell for which UL-DL configurations 1 to 6 are set, and that is destined for the terminal device 1 is detected, the terminal device 1 performs PUSCH transmission in accordance with the uplink grant in the subframe n+k that is specified (selected or determined) based on the table in FIG. 13.

In a case where, in the subframe n, the PHICH that is accompanied by a NACK that corresponds to the serving cell for which the UL-DL configurations 1 to 6 are set, and that is destined for the terminal device 1 is detected, the terminal device 1 performs the PUSCH transmission on the subframe n+k that is specified (selected or determined) based on the table in FIG. 13.

A two-bit uplink index (UL index) is included in the uplink grant that corresponds to the serving cell for which the UL-DL configuration 0 is set and that is destined for the terminal device 1. The uplink index (UL index) is not included in the uplink grant that corresponds to the serving cell for which the UL-DL configurations 1 to 6 are set and that is destined for the terminal device 1.

In a case where, in the subframe n, a most significant bit (MSB) of the uplink index that is included in the uplink grant which corresponds to the serving cell for which the UL-DL configuration 0 is set is set to 1, the terminal device 1 adjusts the PUSCH transmission in accordance with the uplink grant in the subframe n+k that is specified (selected or determined) based on the table in FIG. 13.

In a case where, in a first resource set in a subframe n=0 or 5, the PHICH that is accompanied by the NACK which corresponds to the serving cell for which the UL-DL configuration 0 is set is received, the terminal device 1 adjusts the PUSCH transmission in accordance with the PHICH in the subframe n+k that is specified (selected or determined) based on the table in FIG. 13.

In a case where, in the subframe n, a least significant bit (LSB) of the uplink index that is included in the uplink grant which corresponds to the serving cell for which the UL-DL configuration 0 is set is set to 1, the terminal device 1 adjusts the PUSCH transmission in accordance with the uplink grant in a subframe n+7.

In a case where, in a second resource set in the subframe n=0 or 5, the PHICH that is accompanied by the NACK which corresponds to the serving cell for which the UL-DL configuration 0 is set is received, the terminal device 1 adjusts the PUSCH transmission in accordance with the uplink grant in the subframe n+7.

In a case where, in a subframe n=1 or 6, the PHICH that is accompanied by the NACK which corresponds to the serving cell for which the UL-DL configuration 0 is set is received, the terminal device 1 adjusts the PUSCH transmission in accordance with the uplink grant in the subframe n+7.

For example, in a case where in [SFN=m, subframe 1], the PDCCH/EPDCCH/PHICH that corresponding to the serving cell for which the UL-DL configuration 0 is set is detected, the terminal device 1 performs the PUSCH transmission on a subframe [SFN=m, subframe 7] before which six subframes are present.

The first UL reference UL-DL configuration and the second UL reference UL-DL configuration are used to specify (select or determine) a correspondence between a subframe n to which the PUSCH is allocated and the subframe n+k to which the PHICH to which the PUSCH corresponds is allocated.

In the case where one primary cell is set, or in the case where one primary cell and one secondary cell are set and the first UL reference UL-DL configuration for the primary cell and the first UL reference UL-DL configuration for the secondary cell are the same, in each of the two serving cells, the corresponding first UL reference UL-DL configuration is used to specify (select or determine) a correspondence between the subframe n to which the PUSCH is allocated and the subframe n+k to which the PHICH to which the PUSCH corresponds is allocated.

In the case where one primary cell and one secondary cell are set, and the first UL reference UL-DL configuration for the primary cell and the first UL reference UL-DL configuration for the secondary cell are different from each other, in each of the two serving cells, the corresponding second UL reference UL-DL configuration is used to specify (select or determine) the correspondence between the subframe n to which the PUSCH is allocated and the subframe n+k to which the PHICH to which the PUSCH corresponds is allocated.

FIG. 14 is a diagram illustrating an example of the correspondence between the subframe n to which the PUSCH is allocated, and the subframe n+k to which the PHICH to which the PUSCH corresponds is allocated, according to the present embodiment. The terminal device 1 specifies (selects or determines) the value k in accordance with a table in FIG. 14.

In FIG. 14, in the case where one primary cell is set, or in the case where one primary cell and one secondary cell are set and the first UL reference UL-DL configuration for the primary cell and the first UL reference UL-DL configuration for the secondary cell are the same, the UL-DL configuration refers to the first UL reference UL-DL configuration.

In FIG. 14, in the case where one primary cell and one secondary cell are set and the first UL reference UL-DL configuration for the primary cell and the first UL reference UL-DL configuration for the secondary cell are different from each other, the UL-DL configuration refers to the second UL reference UL-DL configuration.

The first UL reference UL-DL configuration and the second UL reference UL-DL configuration will be hereinafter briefly referred to as the UL-DL configuration when descriptions thereof are provided referring to FIG. 14.

In the case where, in the subframe n, the PUSCH transmission is scheduled, the terminal device 1 determines a PHICH resource in the subframe n+k that is specified from the table in FIG. 14.

For example, in a case where, for the serving cell for which the UL-DL configuration 0 is set, the PUSCH transmission is scheduled in [SFN=m, subframe n=2], the PHICH resource is determined in [SFN=m, subframe n=6].

The first DL reference UL-DL configuration and second DL reference UL-DL configuration will be described in detail below.

The first DL reference UL-DL configuration and the second DL reference UL-DL configuration are used to specify (select or determine) a correspondence between the subframe n to which the PDSCH is allocated and the subframe n+k on which the HARQ-ACK to which the PDSCH corresponds is transmitted.

In the case where one primary cell is set, or in a case where one primary cell and one secondary cell are set and the first DL reference UL-DL configuration for the primary cell and the first DL reference UL-DL configuration for the secondary cell are the same, in each of the two serving cells, the corresponding first DL reference UL-DL configuration is used to specify (select or determine) a correspondence between the subframe n to which the PDSCH is allocated and the subframe n+k on which the HARQ-ACK to which the PDSCH corresponds is transmitted.

In the case where one primary cell and one secondary cell are set, and the first DL reference UL-DL configuration for the primary cell and the first DL reference UL-DL configuration for the secondary cell are different from each other, in each of the two serving cells, the corresponding second DL reference UL-DL configuration is used to specify (select or determine) the correspondence between the subframe n to which the PDSCH is allocated and the subframe n+k on which the HARQ-ACK to which the PDSCH corresponds is transmitted.

FIG. 15 is a diagram illustrating a correspondence between a subframe n−k to which the PDSCH is allocated and the subframe n on which the HARQ-ACK to which the PDSCH corresponds is transmitted. The terminal device 1 specifies (selects or determines) the value k in accordance with a table in FIG. 15.

In FIG. 15, in the case where one primary cell is set, or in the case where one primary cell and one secondary cell are set and the first DL reference UL-DL configuration for the primary cell and the first DL reference UL-DL configuration for the secondary cell are the same, the UL-DL configuration refers to the first DL reference UL-DL configuration.

In FIG. 15, in the case where one primary cell and one secondary cell are set and the first DL reference UL-DL configuration for the primary cell and the first DL reference UL-DL configuration for the secondary cell are different from each other, the UL-DL configuration refers to the second DL reference UL-DL configuration.

The first DL reference UL-DL configuration and the second DL reference UL-DL configuration will be hereinafter briefly referred to as the UL-DL configuration when descriptions thereof are provided referring to FIG. 15.

In a case where, in the subframe n−k (k is specified by the table in FIG. 15) in the serving cell, the PDSCH transmission that requires the performing of the transmission of the corresponding HARQ-ACK that is destined for the terminal device 1 is detected, the terminal device 1 transmits the HARQ-ACK on the subframe n.

For example, the terminal device 1 does not make an HARQ-ACK response to the PDSCH transmission that is used for transmission of system information. For example, the terminal device 1 makes the HARQ-ACK response to the PDSCH transmission that is scheduled by the DCI format which is accompanied by the CRC that is scrambled with the C-RNTI.

For example, in the subframe n=2, the terminal device 1 performs the transmission of the HARQ-ACK in response to the PDSCH that is received on a subframe n−6 and/or n−7, in the serving cell for which the UL-DL configuration 1 is set.

Moreover, the first DL reference UL-DL configuration may not be defined for the serving cell that does not receive the second information. In this case, the terminal device 1 and the base station device 3 may perform processing that is performed based on the first DL reference UL-DL configuration described above, based on the first UL reference UL-DL configuration (the UL-DL configuration for the serving cell). The serving cell that does not receive the second information is a serving cell for which the dynamic TDD is not set.

For example, in a case where one primary cell and one secondary cell are set, the second information for the secondary cell is received without the second information for the primary cell being received, the first UL reference UL-DL configuration (the UL-DL configuration for the serving cell) for the primary cell and the first DL reference UL-DL configuration for the secondary cell are different from each other, and the serving cell is a secondary cell, the second DL reference UL-DL configuration for the serving cell (the secondary cell) may be set based on a pair that is formed by the first UL reference UL-DL configuration for a different serving cell (the primary cell) and the first DL reference UL-DL configuration for the serving cell (the secondary cell).

For example, in the case where one primary cell and one secondary cell are set, the second information for the secondary cell is received without the second information for the primary cell being received, and the first UL reference UL-DL configuration (the UL-DL configuration for the serving cell) for the primary cell and the first DL reference UL-DL configuration for the secondary cell are different from each other, in each of the two second cell, the corresponding second DL reference UL-DL configuration may be used to specify (select or determine) the correspondence between the subframe n to which the PDSCH is allocated and the subframe n+k on which the HARQ-ACK that corresponds to the PDSCH is transmitted.

For example, in a case where one primary cell and one secondary cell are set, the second information for the secondary cell is received without the second information for the primary cell being received, and the first UL reference UL-DL configuration (the UL-DL configuration for the serving cell) for the primary cell and the first DL reference UL-DL configuration for the secondary cell are the same, in the primary cell, the corresponding first UL reference UL-DL configuration (the UL-DL configuration for the serving cell) may be used to specify (select or determine) the correspondence between the subframe n to which the PDSCH is allocated and the subframe n+k on which the HARQ-ACK that corresponds to the PDSCH is transmitted, and, in the secondary cell, the corresponding first DL reference UL-DL configuration may be used to specify (select or determine) the correspondence between the subframe n to which the PDSCH is allocated and the subframe n+k on which the HARQ-ACK that corresponds to the PDSCH is transmitted.

For example, in the case where one primary cell and one secondary cell are set, the second information for the secondary cell is received without the second information for the primary cell being received, and the first UL reference UL-DL configuration (the UL-DL configuration for the serving cell) for the primary cell and the first DL reference UL-DL configuration for the secondary cell are different from each other, in FIGS. 10 and 12, the UL-DL configuration for the primary cell refers to the first UL reference UL-DL configuration for the primary cell.

Transmission power control (TPC) for the PUSCH according to the present embodiment will be described below.

For example, in a case where the transmission on the PUSCH is performed without communication on the PUCCH being performed at the same time, for a certain cell c, the terminal device 1 may set a transmission power value for the transmission on the PUSCH in a certain subframe i, based on Math (1).

$$P_{PUSCH,c}(i) = \min\{P_{CMAX,c}(i), P_{real,c}(i)\} \text{ [dBm]} \quad \text{[Math. 1]}$$

For example, in a case where the transmission on the PUCCH and the transmission on the PUSCH are performed at the same time, for a certain cell c, the terminal device 1 may set the transmission power value for the transmission on the PUSCH in a certain subframe i, based on Math (2).

$$P_{PUSCH,c}(i) = \min\{10\log_{10}(P_{CMAX,c}(i) - P_{PUCCH,c}(i)), P_{real,c}(i)\} \text{ [dBm]} \quad \text{[Math. 2]}$$

$P_{real, c}(i)$ in Math (1) and Math (2) is defined based on Math (3).

$$P_{real,c}(i) = 10\log_{10}(M_{PUSCH,c}(i)) + P_{O\_PUSCH,c}(j) + \alpha_c(j) \cdot PL_c + \Delta_{TF,c}(i) + f_c(i) \quad \text{[Math. 3]}$$

$P_{real, c}(i)$ is a power value that is calculated (estimated) based on real transmission on the PUSCH of a cell c. Furthermore, the calculating (estimating) of the power value based on the real transmission for the PUSCH includes the meaning of the calculating (estimating) of the power value based on the real transmission on the PUSCH.

In a case where the transmission on the PUSCH is not performed, for a certain cell c, the terminal device 1 may assume the transmission power value for the transmission on the PUSCH in a certain subframe i, based on Math (4), in order that the TPC commands that are received through the DCI format 3/3A for the PUSCH may accumulate. $P_{reference, c}(i)$ in Math (4) is defined based on Math (5).

$$P_{PUSCH,c}(i) = \min\{P_{CMAX,c}(i), P_{reference,c}(i)\} \text{ [dBm]} \quad \text{[Math. 4]}$$

$$P_{reference,c}(i) = P_{O\_PUSCH,c}(1) + \alpha_c(1) \cdot PL_c + f_c(i) \quad \text{[Math. 5]}$$

$P_{reference, c}(i)$ is a power value that is calculated (estimated) based a reference format for the PUSCH. At this point, the calculating (estimating) of the power value based on the reference format for the PUSCH includes the meaning of the calculating (estimating) of the power value under the assumption of the transmission on the PUSCH for which the reference format is used.

That is, it is assumed that as the reference format for the PUSCH, $M_{PUSCH, c}=1$ is used in the transmission on the PUSCH in a certain subframe i. Furthermore, $P_{0\_PUSCH, c}(1)$ is assumed as the reference format for the PUSCH. Furthermore, $\alpha c(1)$ is assumed as the reference format for the PUSCH. Furthermore, $\Delta_{TF, c}(i)=0$ is assumed as the reference format for the PUSCH.

In Math (5), in a case where terminal device 1 does not perform the transmission on the PUCCH and the PUSCH in a certain subframe i in a certain cell c, the terminal device 1 may calculate $P_{CMAX,}$ on the assumption that maximum power reduction (MPR)=0 dB, additional maximum power reduction (A-MPR)=0 dB, power management maximum power reduction (P-MPR)=0 dB, and $\Delta T_C$=0 dB, in order that the TPC commands that receive through the DCI format 3/3A for the PUSCH may accumulate. At this point, MPR, A-MPR, P-MPR, and $\Delta T_C$ are parameters that are used to set $P_{CMAX, c}$ that is a value.

At this point, PPUSCH, c(i) indicates the transmission power value for the transmission on the PUSCH in a certain subframe i. min{X, T} is a function for selecting a minimum value from among X and Y. $P_{CMAX, c}$ indicates a maximum transmission power value (which is also referred to as a maximum output power value) and is set by the terminal device 1.

$p_{CMAX, c}$ indicates a linear value of $P_{CMAX, c}$. $P_{PUCCH}$ indicates a linear value of $P_{PUCCH}(i)$. $P_{PUCCH}(i)$ will be described below.

Furthermore, $M_{PUSCH, c}$ indicates a resource (for example, a bandwidth) for the PUSCH, which is allocated by the base station device 3, and is expressed by the number of resource blocks.

$P_{O\_PUSCH, c}(j)$ is a parameter indicating transmission power that is a basis for the transmission on the PUSCH. For example, $P_{0\_PUSCH, c}(j)$ is configured for a sum of $P_{0\_NOMINAL\_PUSCH, c}(j)$ that is a cell-specific parameter that is designated by the higher layer, and $P_{0\_UE\_PUSCH, c}(j)$ that is a user equipment-specific parameter which is designated by the higher layer. At this point, j is 0 for the PUSCH transmission that corresponds to an uplink grant (a semi-persistent grant) which is accompanied by SPS C-RNTI. Furthermore, j is 1 for the PUSCH transmission that corresponds to an uplink grant (a dynamic scheduled grant) At this point, j is 0 for the PUSCH transmission that corresponds to an uplink grant (a semi-persistent grant) which is accompanied by C-RNTI.

$PL_c$ indicates an estimation of downlink path loss for a certain cell c and is calculated in the terminal device 1.

$\alpha_c$ indicates a coefficient by which the path loss for a certain c is multiplied and is designated by the higher layer.

$\Delta_{TF, c}(i)$ indicates an offset value due to a modulation scheme, a coding rate, a resource usage efficiency, or the like. The terminal device 1 calculates $\Delta_{TF, c}(i)$ based on the number of bits of uplink data (UL-SCH) that is transmitted on the PUSCH or the number of bits of a CQI/PMI that is transmitted on the PUSCH, the number of resource elements for initial PUSCH transmission, and the like.

A current state of power control adjustment for the transmission on the PUSCH (PUSCH power control adjustment state) is given by $f_c(i)$. At this point, an indication of whether accumulation for $f_c(i)$ is enabled or disabled is given by the higher layer, based on Accumulation-enabled that is a parameter.

In a case where the accumulation is enabled based on Accumulation-enabled that is the parameter which is given by the higher layer, the terminal device 1 sets a value of $f_c(i)$, based on Math (6).

$$f_c(i)=f_c(i-1)+\delta_{PUSCH,c}(i-K_{PUSCH}) \text{ if accumulation is enabled} \quad [\text{Math. 6}]$$

where $\delta_{PUSCH, c}$ is a correction value and is also referred to as a TPC command. That is, in a case where the accumulation is enabled based on Accumulation-enabled that is the parameter which is given by the higher layer, $\delta_{PUSCH, c}(i-K_{PUSCH})$ indicates values that accumulate in $f_c(i-1)$. At this point, $\delta_{PUSCH, c}(i-K_{PUSCH})$ is indicated based on a value that is received on a certain subframe $(i-K_{PUSCH})$ and that is set for a TPC command field for the PUSCH which is included in the uplink grant and the DCI format 3/3A for the PUSCH for a certain cell.

For example, the value, to which the field (2-bit information field) for the TPC command for the PUSCH that is included in the uplink grant (DCI format 0 or DCI format 4) and the DCI format 3 for the PUSCH is set, is mapped to correction values $\{-1, 0, 1, 3\}$ that accumulate. For example, the value, to which the field (one-bit information command) for the TPC command field for the PUSCH that is included in the DCI format 3A for the PUSCH is set, is mapped to correction values $\{-1, 1\}$ that accumulate.

In a case where the UL-DL configuration 0 is available, the PUSCH transmission on a subframe 2 or 7 is scheduled by the uplink grant, and the LSB of the uplink grant that is included in the uplink grant is set to 1, a value of $K_{PUSCH}$ is 7.

In a case other than the where the UL-DL configuration 0 is available, the PUSCH transmission on a subframe 2 or 7 is scheduled by the uplink grant, and the LSB of the uplink grant that is included in the uplink grant is set to 1, the value of $K_{PUSCH}$ is given by a table in FIG. 16. FIG. 16 is a diagram illustrating the value of $K_{PUSCH}$ according to the present embodiment.

In FIG. 16, in the case where one primary cell is set, or in the case where one primary cell and one secondary cell are set and the first UL reference UL-DL configuration for the primary cell and the first UL reference UL-DL configuration for the secondary cell are the same, the UL-DL configuration refers to the first UL reference UL-DL configuration.

That is, in the case where one primary cell is set, or in the case where one primary cell and one secondary cell are set and the first UL reference UL-DL configuration for the primary cell and the first UL reference UL-DL configuration for the secondary cell are the same, in each of the two serving cells, the first UL reference UL-DL configuration that corresponds to each of the two serving cells is used to specify a correspondence between a subframe $n-K_{PUSCH}$ on which the TPC command for the PUSCH is transmitted and received and the subframe n to which the TPC command is applied.

In FIG. 16, in the case where one primary cell and one secondary cell are set and the first UL reference UL-DL configuration for the primary cell and the first UL reference UL-DL configuration for the secondary cell are different from each other, the UL-DL configuration refers to the second UL reference UL-DL configuration.

That is, in the case where one primary cell and one secondary cell are set and the first UL reference UL-DL configuration for the primary cell and the first UL reference UL-DL configuration for the secondary cell are different from each other, in each of the two serving cells, the second UL reference UL-DL configuration that corresponds to each of the two serving cells is used to specify a correspondence between the subframe $n-K_{PUSCH}$ on which the TPC command for the PUSCH is transmitted and received and the subframe n to which the TPC command is applied.

For example, in a case where, for the serving cell for which the UL-DL configuration 1 is set, the TPC command for the PUSCH is received on [SFN=m, subframe n=4], the terminal device 1 applies the TPC command for the PUSCH in [SFN=m, subframe n=8].

In a case where the accumulation is disabled based on Accumulation-enabled that is the parameter which is given by the higher layer (that is, in a case where the accumulation is not enabled), the terminal device 1 sets the value of $f_c(i)$ based on Math (7).

$$f_c(i)=\delta_{PUSCH,c}(i-K_{PUSCH}) \text{ if accumulation is not enabled} \quad [\text{Math. 7}]$$

That is, in the case where the accumulation is disabled based on Accumulation-enabled that is the parameter which is given by the higher layer, $\delta_{PUSCH, c}(i-K_{PUSCH})$ illustrates an absolute value for $f_c(i)$. That is, $\delta_{PUSCH, c}(i-K_{PUSCH})$ may be enabled only for a subframe i.

For example, the value, to which the field (2-bit information field) for the TPC command for the PUSCH that is included in the uplink grant (DCI format 0 or DCI format 4), is mapped to an absolute value $\{-4, -1, 1, 4\}$.

In the case where the accumulation is disabled based on Accumulation-enabled that is the parameter which is given by the higher layer, the DCI format 3/3A may not be used for the transmission power control for the transmission on the PUSCH.

The transmission power control for the transmission on the PUCCH according to the present embodiment will be described below.

In a case of performing the communication on the PUCCH, the terminal device 1 sets the transmission power value for the communication on the PUCCH in a certain subframe i, based on Math (8). $P_{real\_PUCCH, c}(i)$ in Math (8) is defined based on Math (9).

$$P_{PUCCH,c}(i)=\min\{P_{CMAX,c}, P_{real\_PUCCH,c}(i)\} \text{ [dBM]} \quad [\text{Math. 8}]$$

$$P_{real\_PUCCH,c}(i)=P_{O\_PUCCH,c}+PL_c+h(n_{CQI}, n_{HARQ})+\Delta_{F\_PUCCH}(F)+g(i) \quad [\text{Math. 9}]$$

At this point, $P_{real\_PUCCH, c}(i)$ is a power value that is calculated (estimated) based on the real transmission for the PUCCH. Furthermore, the calculating (estimating) of the power value based on the real transmission for the PUCCH includes the meaning of the calculating (estimating) of the power value based on the real transmission on the PUCCH.

In a case where the transmission on the PUCCH for the primary cell is not performed, the terminal device 1 may assume the transmission power value for the transmission on the PUCCH in a certain subframe i, based on Math (10), in order that the TPC commands that are received through the DCI format 3/3A for the PUCCH may accumulate. $P_{reference, c}(i)$ in Math (10) is defined based on Math (11).

$$P_{PUCCH,c}(i) = \min\{P_{CMAX,c}, P_{reference\_PUCCH,c}(i)\}$$
[dBm] [Math. 10]

$$P_{reference\_PUCCH,c}(i) = P_{O\_PUCCH,c} + PL_c + g(i)$$ [Math. 11]

$P_{reference\_PUCCH, c}(i)$ is a power value that is calculated (estimated) based a reference format for the PUCCH. At this point, the calculating (estimating) of the power value based on the reference format for the PUCCH includes the meaning of the calculating (estimating) of the power value on the assumption of the transmission on the PUCCH for which the reference format is used.

That is, $h(n_{CQI}, n_{HARQ}) = 0$ is assumed as the reference format for the PUCCH. Furthermore, $\Delta_{F\_PUCCH}(F) = 0$ is assumed as the reference format for the PUCCH. Furthermore, a PUCCH format 1a is assumed as the reference format for the PUCCH.

In Math (10), in a case where terminal device 1 does not perform the transmission on the PUCCH and the PUSCH in a certain subframe i in a certain cell c, the terminal device 1 may calculate $P_{CMAX, c}$ on the assumption that MPR=0 dB, A-MPR=0 dB, P-MPR=0 dB, and $\Delta T_c$=0 dB, in order that the TPC commands that receive through the DCI format 3/3A for the PUCCH may accumulate.

At this point, $P_{PUCCH, c}(i)$ indicates the transmission power value for the transmission on the PUCCH in an i-th certain subframe. $P_{O\_PUCCH, c}$ is a parameter indicating transmission power that is a basis for the communication on the PUCCH, and is given by the higher layer.

$h(n_{CQI}, n_{HARQ})$ is a value that is calculated based on the number of bits that are transmitted on the PUCCH, and on a PUCCH format. At this point, $n_{CQI}$ indicates the number of bits of channel state information that is transmitted on the PUCCH, and $n_{HARQ}$ indicates the number of bits of the HARQ-ACK that is transmitted on the PUCCH.

$\Delta_{F\_PUCCH}(F)$ is an offset value that is designated by the higher layer for every format of the PUCCH. For example, $\Delta_{F\_PUCCH}(F)$ for the PUCCH format 1a is always set to 0.

The terminal device 1 may set a value of g(i), based on Math (12).

$$g(i) = g(i-1) + \delta_{PUCCH}(i - K_{PUCCH})$$ [Math. 12]

At this point, $\delta_{PUCCH}$ is a correction value, and is referred to as a TPC command. That is, $\delta_{PUCCH}(i-K_{PUCCH})$ indicates values that accumulate in g(i-1). Furthermore, $\delta_{PUCCH, c}$ (i-$K_{PUCCH}$) is indicated based on a value that is received on a certain subframe (i-$K_{PUCCH}$) and that is set for a TPC command field for the PUCCH which is included in the uplink grant and the DCI format 3/3A for the PUCCH for a certain cell.

For example, the value, to which the field (2-bit information field) for the TPC command for the PUCCH that is included in the downlink grant and the DCI format 3 for the PUCCH is set, is mapped to the correction values {-1, 0, 1, 3} that accumulate. For example, the value, to which the field (one-bit information command) for the TPC command field for the PUCCH that is included in the DCI format 3A for the PUCCH is set, is mapped to the correction values {-1, 1} that accumulate.

The value of $K_{PUCCH}$ is given by the table in FIG. 15.

In FIG. 15, in the case where one primary cell is set, or in the case where one primary cell and one secondary cell are set and the first DL reference UL-DL configuration for the primary cell and the first DL reference UL-DL configuration for the secondary cell are the same, the UL-DL configuration refers to the first DL reference UL-DL configuration.

That is, in the case where one primary cell is set, or in the case where one primary cell and one secondary cell are set and the first DL reference UL-DL configuration for the primary cell and the first DL reference UL-DL configuration for the secondary cell are the same, the first DL reference UL-DL configuration that corresponds to the primary cell is used to specify a correspondence between a subframe n-$K_{PUCCH}$ on which the TPC command for the PUCCH is transmitted and received and the subframe n to which the TPC command is applied.

In FIG. 15, in the case where one primary cell and one secondary cell are set and the first DL reference UL-DL configuration for the primary cell and the first DL reference UL-DL configuration for the secondary cell are different from each other, the UL-DL configuration refers to the second DL reference UL-DL configuration.

That is, in the case where one primary cell and one secondary cell are set and the first DL reference UL-DL configuration for the primary cell and the first DL reference UL-DL configuration for the secondary cell are different from each other, the second DL reference UL-DL configuration that corresponds to the primary cell is used to specify the correspondence between the subframe n-$K_{PUCCH}$ on which the TPC command for the PUCCH is transmitted and received and the subframe n to which the TPC command is applied.

For example, in a case where, for the serving cell for which the UL-DL configuration 1 is set, two TPC commands for the PUCCH is received on [SFN=m, subframe n=0, 1], the terminal device 1 applies the two TPC commands for the PUCCH in [SFN=m, subframe n=7].

At this point, the communication on the PUCCH may be performed only in the primary cell.

Figure 17:
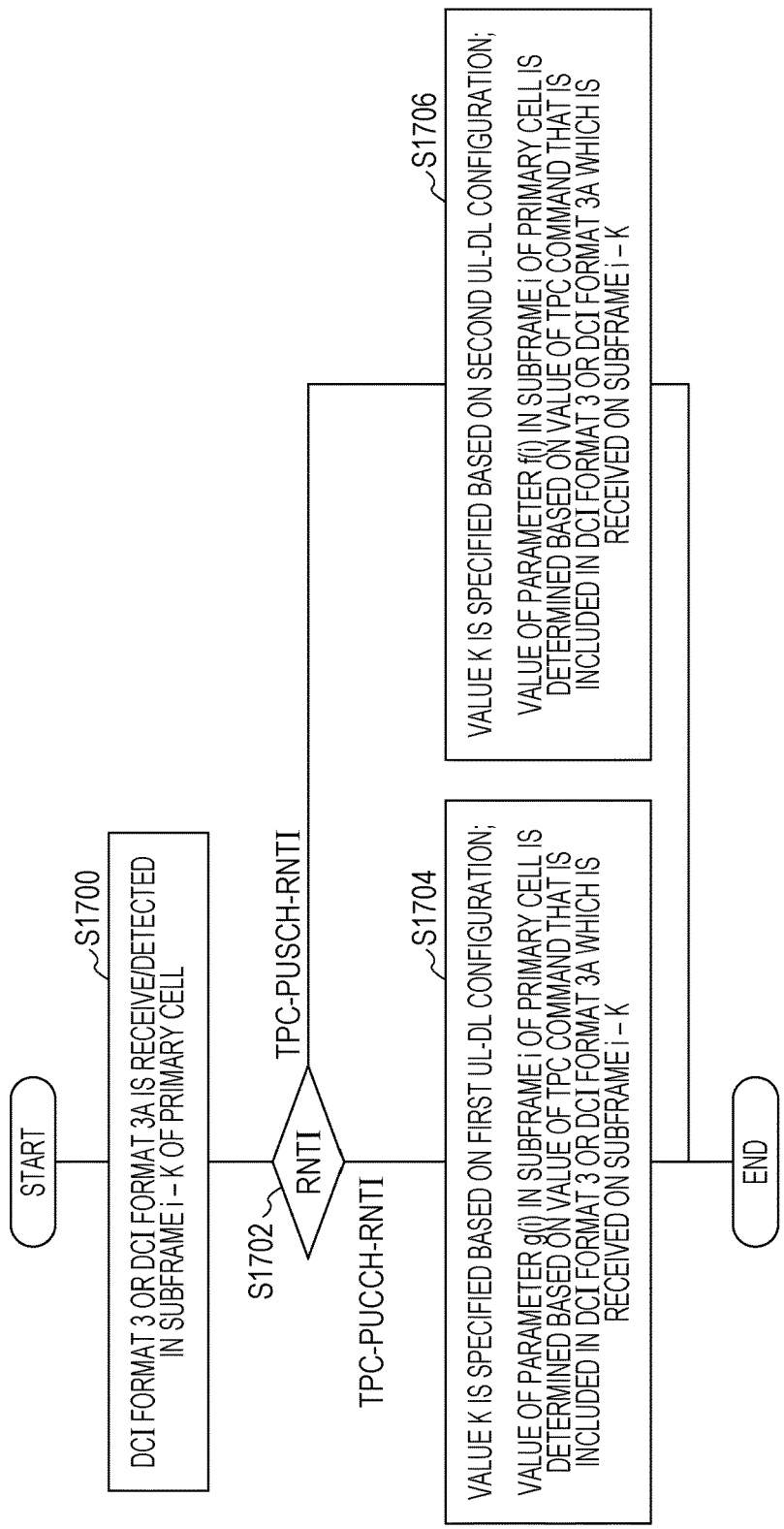
FIG. 17 is a flowchart illustrating one example of a transmission power control method that uses a DCI format 3/3A according to the present embodiment.

FIG. 17 is a flowchart illustrating one example of a transmission power control method that uses the DCI format 3/3A according to the present embodiment.

The terminal device 1 receives/detects the DCI format 3 or the DCI format 3A on a subframe i-K of the primary cell (S1700). The terminal device 1 determines whether or not which one of TPC-PUCCH-RNTI and TPCPUSCH-RNTI the CRC parity bits that are attached to the DCI format 3/3A are scrambled with (S1702).

In a case where the CRC parity bits that are attached to the DCI format 3/3A are scrambled with TPC-PUCCH-RNTI, terminal device 1 specifies the value K based on the first UL-DL configuration, and, based on a value of the TPC command that is included in the DCI format 3 or the DCI format 3A that is received on the subframe i-K, determines a value of g(i) that is a parameter in the subframe i of the primary cell (S1704).

In a case where the CRC parity bits that are attached to the DCI format 3/3A are scrambled with the TPC-PUSCH-RNTI, terminal device 1 specifies the value K based on a second UL-DL configuration, and, based on a value of the TPC command that is included in the DCI format 3 or the DCI format 3A that is received on the subframe i-K, determines a value of f(i) that is a parameter in the subframe i of the primary cell (S1706).

At this point, in the case where one primary cell is set, or in the case where one primary cell and one secondary cell are set and the first DL reference UL-DL configuration for the primary cell and the first DL reference UL-DL configuration for the secondary cell are the same, the first UL-DL configuration is the first DL reference UL-DL configuration.

Furthermore, in the case where one primary cell and one secondary cell are set and the first DL reference UL-DL configuration for the primary cell and the first DL reference UL-DL configuration for the secondary cell are different from each other, the first UL-DL configuration is the second DL reference UL-DL configuration.

Furthermore, in the case where one primary cell is set, or in the case where one primary cell and one secondary cell are set and the first UL reference UL-DL configuration for the primary cell and the first UL reference UL-DL configuration for the secondary cell are the same, the second UL-DL configuration is the first UL reference UL-DL configuration.

Furthermore, in the case where one primary cell and one secondary cell are set and the first UL reference UL-DL configuration for the primary cell and the first UL reference UL-DL configuration for the secondary cell are different from each other, the second UL-DL configuration is the second UL reference UL-DL configuration.

A configuration a device according to the present embodiment will be described below.

Figure 18:
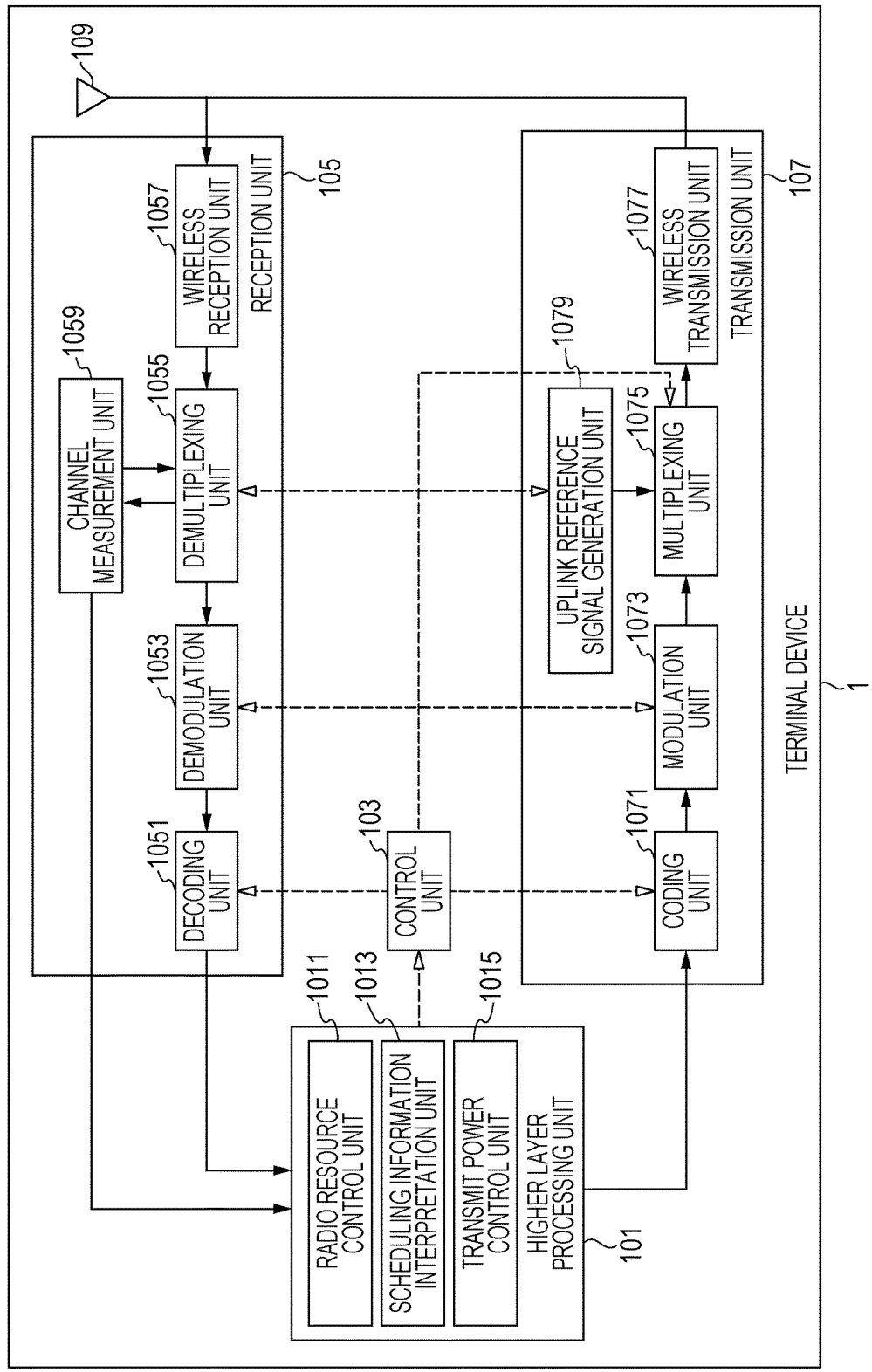
FIG. 18 is a schematic block diagram illustrating a configuration of a terminal device 1 according to the present embodiment.

FIG. 18 is a schematic block diagram illustrating a configuration of the terminal device 1 according to the present embodiment. As illustrated, the terminal device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a scheduling information interpretation unit 1013, and a transmission power control unit 1015. Furthermore, the reception unit 105 is configured to include a decoding unit 1051, a demodulation unit 1053, a demultiplexing unit 1055, a wireless reception unit 1057, a channel measurement unit 1059. Furthermore, the transmission unit 107 is configured to include a coding unit 1071, a modulation unit 1073, a multiplexing unit 1075, a wireless transmission unit 1077, and an uplink reference signal generation unit 1079.

The higher layer processing unit 101 outputs the uplink data (the transport block) generated by a user operation and the like, to the transmission unit 107. Furthermore, the higher layer processing unit 101 performs processing of a medium access control (MAC) layer, a packet data convergence protocol (PDCP) layer, a radio link control (RLC) layer, and a radio resource control (RRC) layer.

The radio resource control unit 1011 that is included in the higher layer processing unit 101 manages various pieces of configuration information of the terminal device 1 itself or various parameters for the terminal device 1. The radio resource control unit 1011 sets various pieces of configuration information/parameters based on the higher layer signal that is received from the base station device 3. The radio resource control unit 1011 sets various pieces of configuration information/parameters based on pieces of information indicating various pieces of configuration information/parameters that are received from the base station device 3. Furthermore, the radio resource control unit 1011 generates information that is arranged in each uplink channel and outputs the generated information to the transmission unit 107. The radio resource control unit 1011 is referred to as a configuration unit 1011.

The scheduling information interpretation unit 1013 that is included in the higher layer processing unit 101 interprets the DCI format (scheduling information) that is received through the reception unit 105, and, based on a result of the interpretation of the DCI format, generate control information in order to perform control of the reception unit 105 and the transmission unit 107, and output the generated control information to the control unit 103.

The transmission power control unit 1015 that is included in the higher layer processing unit 101 performs transmission power control for the transmission on the PUSCH and the PUCCH, based on various pieces of configuration information/parameters, the TPC command, and the like that are managed by the radio resource control unit 1011.

The control unit 103 generates a control signal for generating the control of the reception unit 105 and the transmission unit 107 based on control information from the higher layer processing unit 101. The control unit 103 outputs the generated control signal to the reception unit 105 and the transmission unit 107 and performs the control of the reception unit 105 and the transmission unit 107.

In accordance with the control signal that is input from the control unit 103, the reception unit 105 demultiplexes, demodulates, and decodes a reception signal that is received from the base station device 3 through the transmit and receive antenna unit 109, and outputs the resulting information to the higher layer processing unit 101.

The wireless reception unit 1057 converts (down-converts) a downlink signal that is received through the transmit and receive antenna 109 into a signal in a baseband by performing orthogonal demodulation, removes an unnecessary frequency component, controls an amplification level in such a manner as to suitably maintain a signal level, performs orthogonal demodulation based on an in-phase component and an orthogonal component of the received signal, and converts the resulting orthogonally-demodulated analog signal into a digital signal. The wireless reception unit 1057 removes a portion that is equivalent to a cyclic prefix (CP) from the digital signal that results from the conversion, performs fast Fourier Transform (FFT) on the signal from which the CP is removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes an adjustment of channels, that is, the PHICH, the PDCCH, the EPDCCH, and the PDSCH, using a channel estimate that is input from the channel measurement unit 1059. Furthermore, the demultiplexing unit 1055 outputs a downlink reference signal that results from the multiplexing to the channel measurement unit 1059.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH that is destined for the terminal device 1 itself, and outputs a HARQ indicator that results from the decoding to the higher layer processing unit 101. The demodulation unit 1053 performs demodulation in compliance with a QPSK modulation scheme on the PDCCH and/or the EPDCCH, and outputs a result of the demodulation to the decoding unit 1051. The decoding unit 1051 attempts to perform the decoding of the PDCCH and/or the EPDCCH. In a case where the decoding unit 1051 succeeds in the decoding, the decoding unit 1051 outputs downlink control information that results from the decoding and an RNTI to which the downlink control information corresponds, to the higher layer processing unit 101.

The demodulation unit 1053 performs the demodulation in compliance with the modulation scheme that is notified with the downlink grant, such as Quadrature Phase Shift keying (QPSK), 16 Quadrature Amplitude Modulation (QAM), or 64 QAM, on the PDSCH, and outputs a result of the demodulation to the decoding unit 1051. The decoding unit 1051 performs decoding based on information associated with a coding rate that is notified with the downlink control information, and outputs downlink data (a transport block) that results from the decoding, to the higher layer processing unit 101.

The channel measurement unit 1059 measures a downlink path loss or a channel state from the downlink reference signal that is input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 measures channel measurement and/or interference measurement in order to calculate the CQI.

The transmission unit 107 generates the uplink reference signal in accordance with the control signal, which is input from the control unit 103, performs the coding and the modulation on the uplink data (the transport block), which is input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 performs coding, such as convolutional coding and block coding, on the uplink control information that is input from the higher layer processing unit 101. Furthermore, the coding unit 1071 performs turbo coding, based on information that is used for the scheduling of the PUSCH.

The modulation unit 1073 performs modulation on coded bits, which are input from the coding unit 1071, in compliance with the modulation scheme that is notified with the downlink control information, such as the BPSK, the QPSK, the 16 QAM, or the 64 QAM, or in compliance with a modulation scheme that is prescribed in advance for every channel. Based on the information that is used for the scheduling of the PUSCH, the modulation unit 1073 determines the number of sequences of pieces of data that are space-multiplexed, maps multiple pieces of uplink data that are transmitted on the same PUSCH, to multiple sequences, by using Multiple Input Multiple Output (MIMO) Spatial Multiplexing (SM), and performs precoding on the sequences.

The uplink reference signal generation unit 1079 generates a sequence that is acquired according to a rule (an equation) that is prescribed in advance, based on a physical layer cell identifier (which is also referred to as a physical layer cell identity (PCI), a cell ID, or the like) for identifying the base station device 3, a bandwidth to which the uplink reference signal is mapped, a cyclic shift that is notified with the uplink grant, a value of a parameter for generation of a DMRS sequence, and the like. In accordance with the control signal that is input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for every transmit antenna port. To be more precise, the multiplexing unit 1075 maps the PUCCH and PUSCH signals and the generated uplink reference signal to the resource elements for every transmit antenna port.

The wireless radio transmission unit 1077 performs Inverse Fast Fourier Transform (IFFT) on a signal that results from the multiplexing, generates an SC-FDMA symbol, adds a CP to the generated SC-FDMA symbol, generates a digital signal in a baseband, converts the digital signal in the baseband in an analog signal, removes an unnecessary frequency component using a low pass filter, performs up-converting into a carrier frequency, performs power amplification, and outputs a final result to the transmit and receive antenna 109 for transmission.

Figure 19:
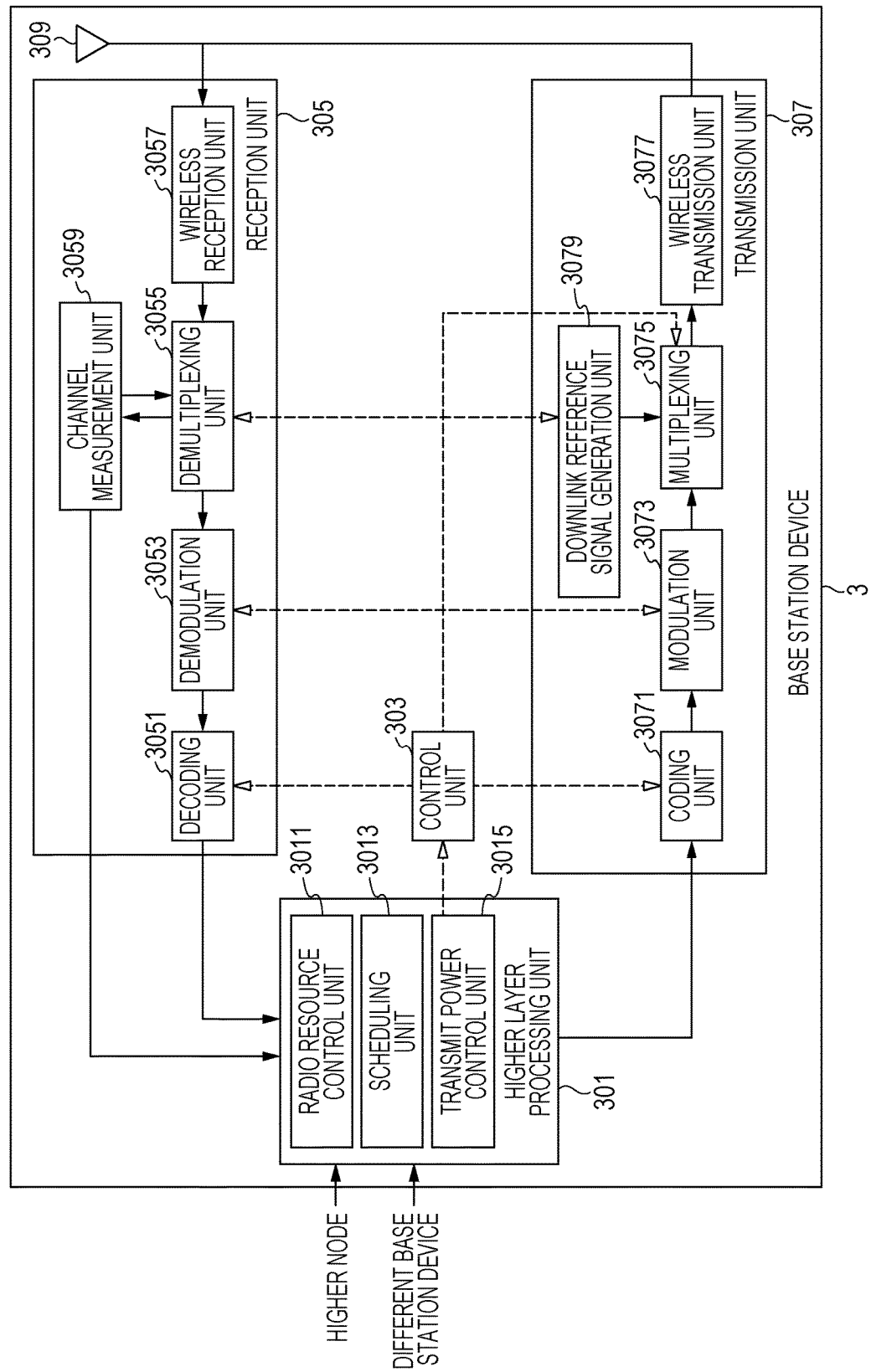
FIG. 19 is a schematic block diagram illustrating a configuration of a base station device 3 according to the present embodiment.

FIG. 19 is a schematic block diagram illustrating a configuration of the base station device 3 according to the present embodiment. As illustrated, the base station device 3 is configured to include a higher layer processing unit 301, a control unit 303, a reception unit 305, a transmission unit 307, and a transmit and receive antenna unit 309. Furthermore, the higher layer processing unit 301 is configured to include a radio resource control unit 3011, a scheduling unit 3013, a transmission power control unit 3015. Furthermore, the reception unit 305 is configured to include a decoding unit 3051, a demodulation unit 3053, a demultiplexing unit 3055, a wireless reception unit 3057, a channel measurement unit 3059. Furthermore, the transmission unit 307 is configured to include a coding unit 3071, a modulation unit 3073, a multiplexing unit 3075, a wireless transmission unit 3077, and a downlink reference signal generation unit 3079.

The higher layer processing unit 301 performs the processing of the Medium Access Control (MAC) layer, the packet data convergence Protocol (PDCP) layer, the radio link control (RLC) layer, and the radio resource control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is arranged in the downlink PDSCH, system information, the RRC message, the MAC control element (CE), and the like, and outputs a result of the generation or of the acquirement to the transmission unit 307. Furthermore, the radio resource control unit 3011 manages various pieces of configuration information of each of the terminal devices 1 or various parameters for each of the terminal devices 1. The radio resource control unit 3011 may set various pieces of configuration information/parameters for each of the terminal devices 1 through the higher layer signal. That is, the radio resource control unit 1011 transmits and broadcasts information indicating the information indicating various pieces of configuration information/parameters. The radio resource control unit 3011 is also referred to as a configuration unit 3011.

The scheduling unit 3013 that is included in the higher layer processing unit 301 determines a frequency and a subframe to which the physical channel (the PDSCH and the PUSCH) is allocated, the coding rate and modulation scheme for the physical channel (the PDSCH and the PUSCH), the transmission power, and the like, from the received channel estimate information and from the channel estimate, channel quality, or the like that is input from the channel measurement unit 3059. The scheduling unit 3013 generates the control information (for example, the DCI format) in order to perform the control of the reception unit 305 and the transmission unit 307 based on a result of the scheduling, and outputs the generated information to the control unit 303. The scheduling unit 3013 determines timing when transmission processing and reception processing are performed.

The transmission power control unit 3015 that is included in the higher layer processing unit 301 performs the transmission power control for the transmission on the PUSCH and the PUCCH by the terminal device 1, through various pieces of configuration information/parameters, the TPC command, and the like that are managed by the radio resource control unit 3011.

Based on the control information from the higher layer processing unit 301, the control unit 303 generates a control signal for performing the control of the reception unit 305 and the transmission unit 307. The control unit 303 outputs the generated control signal to the reception unit 305 and the transmission unit 307, and performs the control of the reception unit 305 and the transmission unit 307.

In accordance with the control signal that is input from the control unit 303, the reception unit 305 demultiplexes, demodulates, and decodes the reception signal that is received from the terminal device 1 through the transmit and receive antenna 309, and outputs the resulting information to the higher layer processing unit 301. The wireless reception unit 3057 converts (down-converts) an uplink signal that is received through the transmit and receive antenna 309 into a signal in a baseband by performing orthogonal demodulation, removes an unnecessary frequency component, controls an amplification level in such a manner as to suitably maintain a signal level, performs orthogonal demodulation based on an in-phase component and an orthogonal component of the received signal, and converts the resulting orthogonally-demodulated analog signal into a digital signal.

The wireless reception unit 3057 removes a portion that is equivalent to a cyclic prefix (CP) from a digital signal that results from the conversion. The wireless reception unit 3057 performs the fast Fourier Transform (FFT) on the signal from which the CP is removed, and outputs the resulting signal to the demultiplexing unit 3055 that extracts the signal in the frequency domain.

The demultiplexing unit 1055 demultiplexes the signal that is input from the wireless reception unit 3057, into the PUCCH, the PUSCH, the uplink reference signal, and the like that are input from the wireless reception unit 3057. Moreover, the demultiplexing is performed based on radio resource allocation information that is determined in advance by the base station device 3, using the radio resource control unit 3011, and that is included in the uplink grant notified to each of the terminal devices 1. Furthermore, the demultiplexing unit 3055 makes an adjustment of channels, that is, the PUCCH and the PUSCH, using the channel estimate that is input from the channel measurement unit 3059. Furthermore, the demultiplexing unit 3055 outputs an uplink reference signal that results from the demultiplexing, to the channel measurement unit 3059.

The demodulation unit 3053 performs Inverse Discrete Fourier Transform (IDFT) on the PUSCH, acquires a modulation symbol, and performs reception signal demodulation on each of the modulation symbols of the PUCCH and the PUSCH, using the modulation scheme that is prescribed in advance, such as the Binary Phase Shift Keying (BPSK), the QPSK, the 16 QAM, or the 64 QAM, or using the modulation scheme that the base station device 3 itself notifies, in advance with the uplink grant, to each of the terminal devices 1. The demodulation unit 3053 demultiplexes the modulation symbols of the multiple pieces of uplink data that are transmitted on the same PUSCH by using the MIMO SM, based on the number of space-multiplexed sequences that is notified in advance with the uplink grant to each of the terminal device 1 and on information indicating the precoding that is performed on the sequences.

The decoding unit 3051 performs the decoding on the coded bits of the PUCCH and the PUSCH, which are demodulated, at the coding rate in compliance with a coding scheme prescribed in advance, which is prescribed in advance, or which is notified in advance with the uplink grant to the terminal device 1 by the base station device 3 itself, and outputs to the higher layer processing unit 101 the uplink data and the uplink control information that are decoded. In a case where the PUSCH is re-transmitted, the decoding unit 3051 performs the decoding using the coded bits that are input from the higher layer processing unit 301 and that are retained in a HARQ buffer, and the demodulated coded bits. The channel measurement unit 309 measures the channel estimate, the channel quality, and the like, from the uplink reference signal that is input from the demultiplexing unit 3055, and outputs a result of the measurement to the demultiplexing unit 3055 and the higher layer processing unit 301.

The transmission unit 307 generates the downlink reference signal in accordance with the control signal that is input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 performs the coding on the HARQ indicator, the downlink control information, and the downlink data that are input from the higher layer processing unit 301, using the coding scheme that is prescribed in advance, such as the block coding, the convolutional coding, or the turbo coding, or using the coding scheme that is determined by the radio resource control unit 3011. The modulation unit 3073 performs the modulation on the coded bits that are input from the coding unit 3071, using the modulation scheme that is prescribed in advance, such as the BPSK, the QPSK, the 16 QAM, or the 64 QAM, or using the modulation scheme that is determined by the radio resource control unit 3011.

The downlink reference signal generation unit 3079 generates as the downlink reference signal a sequence that is already known to the terminal device 1 and that is acquired according to a rule that is prescribed in advance based on the physical layer cell identifier (PCI) for identifying the base station device 3, and the like. The multiplexing unit 3075 multiplexes a modulation symbol of each channel, which results from the modulation, and the generated downlink reference signal. To be more precise, the multiplexing unit 3075 arranges a modulation symbol of each channel, which results from the modulation, and the generated downlink reference signal, in resource elements.

The wireless radio transmission unit 3077 performs the Inverse Fast Fourier Transform (IFFT) on a modulation symbol and the like that result from the multiplexing, generates an OFDM symbol, adds a CP to the generated OFDM symbol, generates a digital signal in a baseband, converts the digital signal in the baseband in an analog signal, removes an unnecessary frequency component using a low pass filter, performs up-converting into a carrier frequency, performs power amplification, and outputs a final result to the transmit and receive antenna 309 for transmission.

More specifically, the terminal device 1 according to the present embodiment includes the reception unit 105 that receives information indicating the first DL reference UL-DL configuration, information indicating the first UL reference UL-DL configuration, information indicating TPC-PUCCH-RNTI, information indicating TPC-PUSCH-RNTI, the information indicating the parameter tpc-index that corresponds to TPC-PUCCH-RNTI, the information indicating the parameter tpc-index that corresponds to TPC-PUSCH-RNTI, the DCI format 3/3A to which the CRC parity bits that are scrambled with TPC-PUCCH-RNTI are attached, and the DCI format 3/3A to which the CRC parity bits that are scrambled with TPC-PUSCH-RNTI are attached.

The terminal device 1 according to the present embodiment includes a configuration unit 1011 that sets the first UL-DL configuration and the second UL-DL configuration.

In a case where the PDSCH is received, the first UL-DL configuration according to the present embodiment is used to specify a subframe on which the HARQ-ACK that corresponds to the PDSCH is transmitted. In a case where the PUSCH is transmitted, the second UL-DL configuration according to the present embodiment is used to specify a subframe on which the HARQ-ACK that corresponds to the PUSCH is received.

In the case where one primary cell is set, or in the case where one primary cell and one secondary cell are set and the first UL reference UL-DL configuration for the primary cell and the first UL reference UL-DL configuration for the secondary cell are the same, the first UL-DL configuration is the first DL reference UL-DL configuration, and the second UL-DL configuration is the first UL reference UL-DL configuration.

In the case where one primary cell and one secondary cell are set and the first DL reference UL-DL configuration for the primary cell and the first DL reference UL-DL configuration for the secondary cell are different from each other, the first UL-DL configuration is the second DL reference UL-DL configuration, and the second UL-DL configuration is the second UL reference UL-DL configuration.

The terminal device 1 according to the present embodiment includes the transmission power control unit 1015 specifies a subframe to which the TPC command that is included in the DCI format 3/3A is applied, based on the RNTI that is used for the scrambling of the CRC parity bits that are attached to the DCI format 3/3A.

Furthermore, the transmission power control unit 1015 according to the present embodiment may specify the value K based on the RNTI that is used for the scrambling of the CRC parity bits which are attached to the DCI format 3/3A, and may calculate the transmission power for the transmission on the subframe i by the terminal device based on the TPC command that is included in the DCI format 3/3A which is received on the subframe i−K.

Furthermore, the transmission power control unit 1015 according to the present embodiment may select the first UL-DL configuration or the second UL-DL configuration based on the RNTI that is used for the scrambling of the CRC parity bits which are attached to the DCI format 3/3A, selects the value K based on the selected first UL-DL configuration or the selected second UL-DL configuration, and may calculate the transmission power for the transmission on the subframe i by the terminal device based on the TPC command that is included in the DCI format 3/3A which is received on the subframe i−K.

Furthermore, in a case where the CRC parity bits that are attached to the DCI format 3/3A are scrambled with TPC-PUCCH-RNTI, the transmission power control unit 1015 according to the present embodiment may specify a value of $K_{PUCCH}$ based on the first UL-DL configuration, and may determine a value of a first parameter g(i) that is used to adjust the transmission power for the transmission of the PUCCH on the subframe based on the TPC command that is included in the DCI format 3/3A which is received on the subframe i−$K_{PUCCH}$.

Furthermore, in a case where the CRC parity bits that are attached to the DCI format 3/3A are scrambled with TPC-PUSCH-RNTI, the transmission power control unit 1015 according to the present embodiment may specify the value of $K_{PUSCH}$ based on the second UL-DL configuration, and may determine a value of a second parameter f(i) that is used to adjust the transmission power for the transmission of the PUSCH on the subframe i, based on the TPC command that is included in the DCI format 3/3A which is received on the subframe i−$K_{PUSCH}$.

More specifically, the base station device 3 according to the present embodiment includes the transmission unit 307 that receives the information indicating the first DL reference UL-DL configuration, the information indicating the first UL reference UL-DL configuration, information indicating TPC-PUCCH-RNTI, information indicating TPC-PUSCH-RNTI, the information indicating the parameter tpc-index that corresponds to TPC-PUCCH-RNTI, the information indicating the parameter tpc-index that corresponds to TPC-PUSCH-RNTI, the DCI format 3/3A to which the CRC parity bits that are scrambled with TPC-PUCCH-RNTI are attached, and the DCI format 3/3A to which the CRC parity bits that are scrambled with TPC-PUSCH-RNTI are attached.

The base station device 3 according to the present embodiment includes a configuration unit 3011 that sets the first UL-DL configuration and the second UL-DL configuration in the terminal device 1 through the higher layer signal.

The base station device 3 according to the present embodiment includes a transmission power control unit 3015 that controls the transmission power for the transmission on the subframe i by the terminal device, with the TPC command that is included in the DCI format 3/3A which is transmitted on the subframe i−K.

In a case where the CRC parity bits that are attached to the DCI format 3/3A are scrambled with TPC-PUCCH-RNTI, the transmission power control unit 3015 according to the present embodiment may specify the value K based on the first UL-DL configuration.

In a case where the CRC parity bits that are attached to the DCI format 3/3A are scrambled with TPC-PUSCH-RNTI, the transmission power control unit 3015 according to the present embodiment may specify the value K based on the second UL-DL configuration.

The transmission power control unit 3015 according to the present embodiment may specify the value of $K_{PUCCH}$ based on the first UL-DL configuration, and, with the TPC command that is included in the DCI format 3/3A which is transmitted on the subframe i−$K_{PUCCH}$, and to which the CRC parity bits that are scrambled with TPC-PUCCH-RNTI are attached, may adjust the first parameter g(i) in the subframe i. The first parameter g(i) is used to control the transmission power for the transmission of the PUCCH by the terminal device.

The transmission power control unit 3015 according to the present embodiment may specify the value of $K_{PUSCH}$ based on the second UL-DL configuration, and, with the TPC command that is included in the DCI format 3/3A which is transmitted on the subframe i−$K_{PUSCH}$, and to which the CRC parity bits that are scrambled with TPC-PUSCH-RNTI are attached, may adjust the second parameter f(i) in the subframe i. The second parameter f(i) is used to control the transmission power for the transmission of the PUSCH by the terminal device.

Thus, the terminal device can efficiently perform processing associated with the transmission power.

A program running on the base station device 3 and the terminal device 1 according to the present invention may be a program (a program for causing a computer to operate) that controls a central processing unit (CPU) and the like in such a manner as to realize the function according to the embodiments of the present invention, which is described above. Then, pieces of information that are handled in these devices temporarily accumulate in a random access memory (RAM) while being processed. Thereafter, the pieces of information are stored in various ROMs or hard disk drives (HDDs) such as a flash read only memory (ROM), and whenever necessary, is read by the CPU to be modified or written.

Moreover, one portion of each of the terminal device 1 and base station device 3 according to the embodiments, which are described above, may be realized by the computer. In that case, this one portion may be realized by recording a program for realizing such control functions on a computer-readable medium and causing a computer system to read the program stored on the recording medium for execution.

Moreover, the "computer system" here is a computer system that is built into the terminal device 1 or the base station device 3 and is defined as including an OS or hardware components such as a peripheral device. Furthermore, the "computer-readable recording medium" refers to a portable medium such as a flexible disk, a magneto-optical disk, a ROM, and a CD-ROM, and a storage device such as a hard disk that is built into the computer system.

Moreover, the "computer-readable recording media" may also include a medium that dynamically retains the program for a short period of time, such as a communication line that is used in a case where the program is transmitted over a network such as the Internet or over a communication circuit such as a telephone circuit, and a medium that retains the program for a fixed period of time, such as a volatile memory within the computer system, which functions as a server or a client in such a case. Furthermore, the program described above may be one for realizing some of the functions described above and additionally may be one that can realize the functions described above in combination with a program that is already recorded on the computer system.

Furthermore, the base station device 3 according to the embodiments, which are described above, can be realized as an aggregation (a device group) that is configured from multiple devices. Each of the devices that constitute the device group may be equipped with some portion of or all portions of each function or each functional block of the base station device 3 according to the embodiment, which is described. The device group itself may have each general function or each general functional block of the base station device 3. Furthermore, the terminal device 1 according to the embodiments, which are described, can also communicate with the base station device as the aggregation.

Furthermore, the base station device 3 according to the embodiment, which is described, may also be referred to as an Evolved Universal Terrestrial Radio Access Network (E-UTRAN). Furthermore, the base station device 3 according to the embodiment, which is described, may have some portions of or all portions of a function of a higher node above an eNodeB.

Furthermore, some portions of or all portions of each of the terminal device 1 and the base station device 3 according to the embodiment, which are described, may be realized as an LSI that is a typical integrated circuit and may be realized as a chip set. Each functional block of the terminal device 1 and the base station device 3 may be individually realized into a chip, and some of, or all of the functional blocks may be integrated into a chip. Furthermore, a circuit integration technique is not limited to the LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, according to the embodiments, as described above, the terminal device is described as one example of a communication device, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific configuration is not limited to the embodiments and also includes an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to each of the embodiments is also included in the technical scope of the present invention.

INDUSTRIAL APPLICABILITY 1 (1A, 1B, AND 1C) TERMINAL DEVICE
3 BASE STATION DEVICE
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL UNIT
1013 SCHEDULING INFORMATION INTERPRETATION UNIT
1015 TRANSMISSION POWER CONTROL UNIT

3011 RADIO RESOURCE CONTROL UNIT
3013 SCHEDULING UNIT
3015 TRANSMISSION POWER CONTROL UNIT

The invention claimed is:

1. A terminal device which is configured to or programmed to communicate with a base station device, the terminal device comprising:
reception circuitry configured to or programmed to:
decode a physical downlink control channel with a downlink control information format 3 in a subframe i-K, and
receive first radio resource control layer information and second radio resource control layer information; and
transmission power control circuitry configured to or programmed to set transmission power using a transmission power control command that is included in the downlink control information format 3, wherein
at least two types of different uplink-downlink configurations, including a first uplink-downlink configuration and a second uplink-downlink configuration, are defined to determine subframe allocation for uplink and downlink,
in a case where cyclic redundancy check parity bits that are attached to the downlink control information format 3 are scrambled with a first radio network temporary identifier (RNTI), application timing i for the transmission power control command is specified by a first value of K corresponding to the first uplink-downlink configuration, the first uplink-downlink configuration being based on the first radio resource control layer information, and
in a case where the cyclic redundancy check parity bits that are attached to the downlink control information format 3 are scrambled with a second RNTI, application timing i for the transmission power control command is specified by a second value of K corresponding to the second uplink-downlink configuration, the second uplink-downlink configuration being based on the second radio resource control layer information, the second RNTI being different from the first RNTI.

2. The terminal device according to claim 1, wherein
in a case where the cyclic redundancy check parity bits that are attached to the downlink control information format 3 are scrambled with the first RNTI, the application timing for the transmission power control command is based on a first table showing a first relationship between the first uplink-downlink configuration, a first subframe in which the physical downlink control channel with the downlink control information format 3 is detected and a second subframe in which the transmission power control command is applied, and
in a case where the cyclic redundancy check parity bits that are attached to the downlink control information format 3 are scrambled with the second RNTI, the application timing for the transmission power control command is based on a second table showing a second relationship between the second uplink-downlink configuration, the first subframe and the second subframe, the second table being different from the first table.

3. A wireless communication method that is used in a terminal device which is configured to or programmed to communicate with a base station device, the wireless communication method comprising:
decoding a physical downlink control channel with a downlink control information format 3 in a subframe i-K;
receiving first radio resource control layer information and second radio resource control layer information; and
setting transmission power using a transmission power control command that is included in the downlink control information format 3, wherein
at least two types of different uplink-downlink configurations, including a first uplink-downlink configuration and a second uplink-downlink configuration, are defined to determine subframe allocation for uplink and downlink,
in a case where cyclic redundancy check parity bits that are attached to the downlink control information format 3 are scrambled with a first radio network temporary identifier (RNTI), application timing i for the transmission power control command is specified by a first value of K corresponding to the first uplink-downlink configuration, the first uplink-downlink configuration being based on the first radio resource control layer information, and
in a case where the cyclic redundancy check parity bits that are attached to the downlink control information format 3 are scrambled with a second RNTI, application timing i for the transmission power control command is specified by a second value of K corresponding to the second uplink-downlink configuration, the second uplink-downlink configuration being based on the second radio resource control layer information, the second RNTI being different from the first RNTI.

4. The wireless communication method according to claim 3, wherein
in a case where the cyclic redundancy check parity bits that are attached to the downlink control information format 3 are scrambled with the first RNTI, the application timing for the transmission power control command is based on a first table showing a first relationship between the first uplink-downlink configuration, a first subframe in which the physical downlink control channel with the downlink control information format 3 is detected and a second subframe in which the transmission power control command is applied, and
in a case where the cyclic redundancy check parity bits that are attached to the downlink control information format 3 are scrambled with the second RNTI, the application timing for the transmission power control command is based on a second table showing a second relationship between the second uplink-downlink configuration, the first subframe and the second subframe, the second table being different from the first table.

5. A base station device which is configured to or programmed to communicate with a terminal device, the base station device comprising:
transmission circuitry configured to or programmed to transmit a physical downlink control channel with a downlink control information format 3 in a subframe i-K, and
transmit first radio resource control layer information and second radio resource control layer information; and
transmission power control circuitry configured to or programmed to set transmission power for the terminal device using a transmission power control command that is included in the downlink control information format 3, wherein
at least two types of different uplink-downlink configurations, including a first uplink-downlink configuration and a second uplink-downlink configuration, are defined to determine subframe allocation for uplink and downlink, in a case where cyclic redundancy check parity bits that are attached to the downlink control information format 3 are scrambled with a first radio network temporary identifier (RNTI), application timing i for the transmission power control command is specified by a first value of K corresponding to the first uplink-downlink configuration, the first uplink-downlink configuration being based on the first radio resource control layer information, and in a case where the cyclic redundancy check parity bits that are attached to the downlink control information format 3 are scrambled with a second RNTI, application timing i for the transmission power control command is specified by a second value of K corresponding to the second uplink-downlink configuration, the second uplink-downlink configuration being based on the second radio resource control layer information, the second RNTI being different from the first RNTI.

6. The base station device according to claim 5, wherein in a case where the cyclic redundancy check parity bits that are attached to the downlink control information format 3 are scrambled with the first RNTI, the application timing for the transmission power control command is based on a first table showing a first relationship between the first uplink-downlink configuration, a first subframe in which the physical downlink control channel with the downlink control information format 3 is detected and a second subframe in which the transmission power control command is applied, and in a case where the cyclic redundancy check parity bits that are attached to the downlink control information format 3 are scrambled with the second RNTI, the application timing for the transmission power control command is based on a second table showing a second relationship between the second uplink-downlink configuration, the first subframe and the second subframe, the second table being different from the first table.

7. A wireless communication method that is used in a base station device which is configured to or programmed to communicate with a terminal device, the wireless communication method comprising:

transmitting a physical downlink control channel with a downlink control information format 3 in a subframe i-K;

transmitting first radio resource control layer information and second radio resource control layer information; and setting transmission power for the terminal device using a transmission power control command that is included in the downlink control information format 3, wherein at least two types of different uplink-downlink configurations, including a first uplink-downlink configuration and a second uplink-downlink configuration, are defined to determine subframe allocation for uplink and downlink, in a case where cyclic redundancy check parity bits that are attached to the downlink control information format 3 are scrambled with a first radio network temporary identifier (RNTI), application timing i for the transmission power control command is specified by a first value of K corresponding to the first uplink-downlink configuration, the first uplink-downlink configuration being based on the first radio resource control layer information, and in a case where the cyclic redundancy check parity bits that are attached to the downlink control information format 3 are scrambled with a second RNTI, application timing i for the transmission power control command is specified by a second value of K corresponding to the second uplink-downlink configuration, the second uplink-downlink configuration being based on the second radio resource control layer information, the second RNTI being different from the first RNTI.

8. The wireless communication method according to claim 7, wherein in a case where the cyclic redundancy check parity bits that are attached to the downlink control information format 3 are scrambled with the first RNTI, the application timing for the transmission power control command is based on a first table showing a first relationship between the first uplink-downlink configuration, a first subframe in which the physical downlink control channel with the downlink control information format 3 is detected and a second subframe in which the transmission power control command is applied, and in a case where the cyclic redundancy check parity bits that are attached to the downlink control information format 3 are scrambled with the second RNTI, the application timing for the transmission power control command is based on a second table showing a second relationship between the second uplink-downlink configuration, the first subframe and the second subframe, the second table being different from the first table.

* * * * *